United States Patent
Ito

(10) Patent No.: US 10,185,114 B2
(45) Date of Patent: Jan. 22, 2019

(54) OPTICAL LENS, LENS UNIT, IMAGING MODULE, ELECTRONIC APPARATUS, INJECTION MOLDING MOLD AND INJECTION MOLDING METHOD

(71) Applicant: FUJIFILM Corporation, Tokyo (JP)

(72) Inventor: Hidekane Ito, Saitama (JP)

(73) Assignee: FUJIFILM Corporation, Tokyo (JP)

(*) Notice: Subject to any disclaimer, the term of this patent is extended or adjusted under 35 U.S.C. 154(b) by 48 days.

(21) Appl. No.: 15/259,611

(22) Filed: Sep. 8, 2016

(65) Prior Publication Data
US 2016/0377828 A1    Dec. 29, 2016

Related U.S. Application Data

(63) Continuation of application No. PCT/JP2015/051332, filed on Jan. 20, 2015.

(30) Foreign Application Priority Data

Mar. 18, 2014 (JP) ................. 2014-055123

(51) Int. Cl.
*G02B 7/02* (2006.01)
*B29D 11/00* (2006.01)
(Continued)

(52) U.S. Cl.
CPC .......... *G02B 7/022* (2013.01); *B29C 45/0046* (2013.01); *B29D 11/0048* (2013.01);
(Continued)

(58) Field of Classification Search
CPC ............. B29L 2011/0016; B22F 5/007; B29C 45/0025; B29C 45/26; B29C 45/27;
(Continued)

(56) References Cited

U.S. PATENT DOCUMENTS

| 2013/0148208 A1 | 6/2013 | Yang et al. |
| 2013/0265660 A1 | 10/2013 | Yoshida et al. |
| 2014/0347752 A1* | 11/2014 | Koike .......... C03B 11/08 359/819 |

FOREIGN PATENT DOCUMENTS

| JP | 2007-245685 A | 9/2007 |
| JP | 2010-14983 A | 1/2010 |

(Continued)

OTHER PUBLICATIONS

International Search Report for PCT/JP2015/051332 (PCT/ISA/210) dated Mar. 17, 2015.
(Continued)

*Primary Examiner* — Alicia M Harrington
(74) *Attorney, Agent, or Firm* — Birch, Stewart, Kolasch & Birch, LLP

(57) ABSTRACT

The optical lens 10 having an optical function portion 12 having optical functions; and a flange portion 14 formed around the optical function portion 12. The flange portion 14 has, on a side surface thereof, a cut section 42 which is formed by cutting a gate portion 16. In a case where the following are viewed from the optical axis direction of the optical lens 10, a thinnest portion 18 in a region 44 surrounded by lines L1 and L2, which respectively connect both ends 42a and 42b of the cut section 42 to the optical axis center O of the optical lens 10, and a line L3, which connects both ends 42a and 42b, is present in the optical function portion 12. The flange portion 14 has a concave portion 40 outside the region 44.

12 Claims, 22 Drawing Sheets

(51) Int. Cl.
  *B29C 45/37* (2006.01)
  *G02B 13/00* (2006.01)
  *B29L 11/00* (2006.01)
  *B29C 45/00* (2006.01)
(52) U.S. Cl.
  CPC ........ *G02B 13/001* (2013.01); *B29C 45/0025* (2013.01); *B29C 45/37* (2013.01); *B29L 2011/0016* (2013.01); *G02B 13/0045* (2013.01)
(58) Field of Classification Search
  CPC ................. B29C 45/38; B29C 45/561; B29C 2045/0029; B29C 2045/2714; B29C 45/00; B29C 45/0046; B29C 45/7207; B29C 45/37; G02B 7/022; G02B 13/001; G02B 13/0045; B29D 11/0048
  See application file for complete search history.

(56) References Cited

FOREIGN PATENT DOCUMENTS

| | | |
|---|---|---|
| JP | 2013-218116 A | 10/2013 |
| WO | WO 2012/118041 A1 | 9/2012 |
| WO | WO 2013/094173 A1 | 6/2013 |

OTHER PUBLICATIONS

Written Opinion of the International Searching Authority for PCT/JP2015/051332 (PCT/ISA/237) dated Mar. 17, 2015.

\* cited by examiner

FIG. 12

| SAMPLE No. | 1 | 2 | 3 | 4 | 5 | 6 | 7 |
|---|---|---|---|---|---|---|---|
| T1 (mm) | 0.25 | 0.25 | 0.25 | 0.25 | 0.25 | 0.25 | 0.25 |
| B (mm) | 0.5 | 0.5 | 0.5 | 0.5 | 0.5 | 0.5 | 0.5 |
| C (mm) | 0.4 | 0.35 | 0.3 | 0.25 | 0.2 | 0.15 | 0.1 |
| B-C (mm) | 0.1 | 0.15 | 0.2 | 0.25 | 0.3 | 0.35 | 0.4 |
| T2/T1 | 0.4 | 0.6 | 0.8 | 1 | 1.2 | 1.4 | 1.6 |
| QUALITY EVALUATION | GOOD | GOOD | GOOD | GOOD | GOOD | NORMAL | POOR |

FIG. 13

| SAMPLE No. | H1 (°) | H2 (°) | H3 (°) | FLANGE AREA S1 (cm²) | CONCAVE 1 AREA (cm²) | CONCAVE 2 AREA (cm²) | CONCAVE 3 AREA (cm²) | TOTAL CONCAVE AREA S2 (cm²) | TOTAL CONCAVE AREA / FLANGE AREA |
|---|---|---|---|---|---|---|---|---|---|
| 8 | 30 | 20 | 96.7 | 14.72 | 2.22 | 2.49 | 2.22 | 6.93 | 0.47 |
| 9 | 30 | 30 | 90 | 14.72 | 2.23 | 2.23 | 2.23 | 6.69 | 0.45 |
| 10 | 40 | 40 | 80 | 14.72 | 1.97 | 1.97 | 1.97 | 5.91 | 0.40 |
| 11 | 50 | 50 | 70 | 14.72 | 1.71 | 1.71 | 1.71 | 5.13 | 0.35 |
| 12 | 20 | - | - | 14.72 | 9.67 | - | - | 9.67 | 0.66 |

FIG. 14A

| SAMPLE No. | H1 (°) | H2 (°) | H3 (°) | FLANGE AREA S1 (cm²) | CONCAVE 1 AREA (cm²) | CONCAVE 2 AREA (cm²) | CONCAVE 3 AREA (cm²) | TOTAL CONCAVE AREA S2 (cm²) | TOTAL CONCAVE AREA / FLANGE AREA |
|---|---|---|---|---|---|---|---|---|---|
| 13 | 60 | 58.5 | 61.0 | 14.72 | 1.46 | 1.49 | 1.46 | 4.41 | 0.30 |
| 14 | 40.5 | 40 | 79.8 | 14.72 | 1.96 | 1.97 | 1.96 | 5.89 | 0.40 |
| 15 | 30 | 31 | 89.3 | 14.72 | 2.21 | 2.2 | 2.21 | 6.62 | 0.45 |
| 16 | 20 | 20 | 100 | 14.72 | 2.47 | 2.47 | 2.47 | 7.41 | 0.50 |
| 17 | 25 | 10 | 105 | 14.72 | 2.89 | 2.98 | 2.89 | 8.76 | 0.60 |

| TOTAL CONCAVE AREA / FLANGE AREA (S2/S1) | T2/T1 | DETERMINATION RESULT |
|---|---|---|
| 0.3 | 0.6 | NO WELD LINES |
| 0.4 | 0.6 | NO WELD LINES |
| 0.45 | 1.0 | NO WELD LINES |
| 0.45 | 0.6 | NO WELD LINES |
| 0.5 | 1.0 | NO WELD LINES |
| 0.5 | 0.6 | NO WELD LINES |
| 0.6 | 1.4 | NO WELD LINES |
| 0.6 | 1.0 | NO WELD LINES |
| 0.6 | 0.6 | NO WELD LINES |

OPTICAL LENS, LENS UNIT, IMAGING MODULE, ELECTRONIC APPARATUS, INJECTION MOLDING MOLD AND INJECTION MOLDING METHOD

CROSS-REFERENCE TO RELATED APPLICATIONS

This application is a Continuation of PCT International Application No. PCT/JP2015/051332 filed on Jan. 20, 2015, which claims priority under 35 U.S.C. § 119(a) to Japanese Patent Application No. 2014-55123 filed on Mar. 18, 2014. Each of the above applications is hereby expressly incorporated by reference, in their entirety, into the present application.

BACKGROUND OF THE INVENTION

1. Field of the Invention

The present invention relates to an optical lens having an optical function portion and a flange portion, a lens unit, an imaging module, an electronic apparatus, an injection molding mold, and an injection molding method.

2. Description of the Related Art

Mobile-type electronic apparatuses such as a mobile phone having an imaging function are equipped with a small and thin imaging module. The imaging module has a structure where a lens unit and an imaging element unit are incorporated. The lens unit has a built-in imaging lens. The imaging element unit has a built-in imaging element such as a charge coupled device (CCD) image sensor or a complementary metal oxide semiconductor (CMOS) image sensor.

Most of the optical lenses built into lens units are formed through injection molding using resin.

For example, JP2010-014983A discloses a method of molding a resin lens, which is used as a pickup lens for optical discs, by using an injection molding mold. The resin lens is molded together with a sprue portion which is formed of a sprue, a runner section which is formed of a runner, and a gate portion which is formed of a gate.

US2013/0148208A discloses a method of molding a plastic optical lens having a sprue gate surface by using an injection molding mold. According to the method, in order to avoid voids in the optical effective diameter region and linear defects called weld lines occurring, a protrusion portion of an optical lens is formed due to a channel of an inlet disposed between an optical effective diameter region and the sprue gate surface, and molten resin is prompted to rapidly flow into the optical effective diameter region at the time of molding.

SUMMARY OF THE INVENTION

The above-mentioned optical lens is made by flowing molten resin from a gate into a space formed between a pair of molding molds, and is provided with an optical function portion, through which light passes in a case where the lens is built into an imaging module, and a flange portion which is disposed around the optical function portion.

In a case where the optical function portion of the optical lens is built into an imaging module, the optical function portion is a part through which light passes and which has optical characteristics of the lens. Accordingly, in order to secure the optical characteristics of the lens, particularly, it is necessary for the optical function portion of the optical lens to be molded with high accuracy.

However, in a conventional molding method, a thin and small-size optical lens (particularly, the optical function portion) cannot always be molded with high accuracy.

FIG. 23 is a plan view of a rear surface of the optical lens 10 formed in the conventional molding method as viewed from the optical axis direction. FIG. 24 is a cross-sectional view of the optical lens 10 taken along the sectional line 24-24 of FIG. 23. The optical lens 10 includes an optical function portion 12 that is provided at the center and a flange portion 14 that is provided around the optical function portion 12. A gate portion 16 is provided on the outer peripheral portion of the flange portion 14. As shown in FIG. 24, the front surface and the rear surface of the optical function portion 12 are formed to be curved, the front surface and the rear surface of the flange portion 14 are formed to be planar, and a thinnest portion 18 is provided on a part of the vicinity of the periphery of the optical function portion 12.

FIG. 25 is a cross-sectional view illustrating an example of a conventional injection molding mold 20 which is used to mold the optical lens 10 shown in FIGS. 23 and 24. The injection molding mold 20 includes a first mold 21 and a second mold 22. By causing molten resin to flow from a gate 26 into a space (hereinafter referred to as a "resin inflow space") 28 formed between the first mold 21 and the second mold 22 and to cool down, the optical lens 10 is molded. In the example shown in FIG. 25, the front surfaces of the optical function portion 12 and the flange portion 14 of the optical lens 10 are molded by the first mold 21, and the rear surfaces of the optical function portion 12 and the flange portion 14 are molded by the second mold 22. Accordingly, in the injection molding mold 20 (the first mold 21 and the second mold 22), a narrowest portion (hereinafter referred to as a "thinnest portion molding section 29") for molding the thinnest portion 18 is not present on a flange molding portion 24, which molds the flange portion 14, but is present on a part of an optical molding portion 23, which molds the optical function portion 12.

The resin flowed into the injection molding mold 20 gradually spreads from the gate 26, and finally fills the entire area of the resin inflow space 28. However, in the filling process, the resin preferentially flows into a location to which it is easier for the resin to flow. For example, "the location to which it is easier for the resin to flow" described herein corresponds to "a location where a spacing between the first mold 21 and the second mold 22 is large (that is, a location where a thickness of the molded optical lens 10 is large)" or "a location where the temperatures of the first mold 21 and the second mold 22 are high". The resin flowed into the injection molding mold 20 preferentially spreads toward such a location.

FIG. 26 is a plan view of the resin inflow space 28, which is formed between the first mold 21 and the second mold 22 shown in FIG. 25, as viewed from a direction (the optical axis direction of the optical lens 10) of the arrow "Z" of FIG. 25, and shows an example of positions to which the resin flows in accordance with elapse of time. "P1" to "P9" in FIG. 26 indicate the temporal positions of the resin flowed from the gate 26 into the resin inflow space 28. "P1" indicates a boundary position of the resin from a start of inflow of the resin after passage of a first time period. "P2" indicates a boundary position of the resin from the start of inflow of the resin after passage of a second time period (here, first time period<second time period). Likewise, "P3" to "P9" also indicate the boundary positions of the resin in the time period from the start of inflow of the resin.

As shown in FIG. 26, in the conventional molding method, the resin, which is flowed from the gate 26 into the resin inflow space 28, spreads along the flange molding portion 24 in the resin inflow space 28, and spreading proceeds in a part other than the optical molding portion 23 in the resin inflow space 28 (refer to "P1" to "P6" of FIG. 26). Then, the resin spreads to the flange molding portion 24 of the resin inflow space 28 to some extent, and thereafter gradually flows into the optical molding portion 23. Subsequently, broad spreading of the resin to the optical molding portion 23 of the resin inflow space 28 is a final step of a molding process, and in some cases, the resin perfectly broadly spreads in the flange molding portion 24. Thereafter, the resin broadly spreads in the optical molding portion 23.

The reason why the resin is unlikely to broadly spread in the optical molding portion 23 of the resin inflow space 28 is as follows: in the resin inflow space 28 (the injection molding mold 20), the thinnest portion molding section 29 having a narrow spacing for molding the thinnest portion 18 of the optical lens 10 obstructs the inflow of the resin into the optical molding portion 23. For example, a ratio of a thickness B of the flange portion 14 to a thickness T1 of the thinnest portion 18 may be "B:T1=2~2.5:1". In this case, the resin is highly unlikely to broadly spread in the optical molding portion 23 of the resin inflow space 28.

If a timing at which the optical molding portion 23 of the resin inflow space 28 is filled with the resin is in the final step of the molding process, there is no room for escape of air. Therefore, in a state where air is incorporated into the optical function portion 12, the optical lens 10 is molded, and the air causes transfer failure of the optical function portion 12 and voids (holes). Further, although the timing at which the optical molding portion 23 of the resin inflow space 28 is filled with the resin is not in the final step of the molding process, if the resin flows into the optical molding portion 23 such that the inflow is significantly slower than inflow into the flange molding portion 24, so-called weld lines are formed in the molded optical lens 10 (particularly the optical function portion 12).

As described above, in a case where the optical lens 10 is formed through injection molding, the accuracy in the molding of the optical function portion 12 of the optical lens 10 depends on the timing, at which the resin flows into the optical molding portion 23 of the resin inflow space 28 of the injection molding mold 20, and a timing at which the resin proceeds into the flange molding portion 24.

In addition, in terms of prompting the resin to flow into the optical molding portion 23, an increase in spacing of the thinnest portion molding section 29 of the resin inflow space 28 (injection molding mold 20) is effective. However, the thinnest portion 18 of the optical lens 10 constitutes a part of the optical function portion 12, and thus it is difficult to change the spacing (the thickness of the thinnest portion 18) of the thinnest portion molding section 29 in order to secure the optical characteristics of the optical function portion 12.

The present invention has been made in consideration of the above-mentioned situation. An object of the invention is to provide the following: an injection molding method and an injection molding mold for molding with high accuracy the optical lens having the optical function portion with desired optical characteristics by controlling a fluid state of the resin in the injection molding mold; an optical lens molded by the injection molding method and the injection molding mold; a lens unit using the optical lens; modules; and electronic apparatuses.

An aspect of the present invention relates to an optical lens comprising: an optical function portion that has an optical function; and a flange portion that is formed around the optical function portion, in which the flange portion has a cut section, which is formed by cutting a gate portion, on a side surface thereof, in which in a case where the following are viewed from a direction of an optical axis of the optical lens, a thinnest portion in a region surrounded by two lines, which connect both ends of the cut section and a center of the optical axis of the optical lens, and a single line, which connects both ends of the cut section, is present in the optical function portion, and in which the flange portion has a concave portion outside the region.

The concave portion provided in the flange portion of the optical lens according to the aspect can be molded using a convex portion provided in an injection molding mold, and the space, into which the resin can flow, decreases in size at the position of the convex portion in the injection molding mold. The space, which is decreased in size by the convex portion, is a space into which the resin for forming the flange portion closer to the outer periphery than the optical function portion including the thinnest portion of the optical lens flows, and the convex portion of the injection molding mold prevents the resin from flowing at the time of molding. Since the convex portion of the injection molding mold prevents the resin for forming the flange portion from flowing at the time of molding, the resin is prompted to flow into "the location where the optical function portion including the thinnest portion of the optical lens is formed" in the injection molding mold. As described above, at the time of molding, the optical lens according to the aspect is molded by controlling the following states: "a fluid state of the resin that flows to the location where the optical function portion including the thinnest portion of the optical lens is formed in the injection molding mold"; and "a fluid state of the resin that flows to a location where the flange portion of the optical lens is formed in the injection molding mold". As a result, it is possible to form, with high accuracy, the optical function portion having desired optical characteristics.

The "optical function portion" described herein is a part that is responsible for the optical characteristics of the lens, and light passes through a part or the entirety of the optical function portion in a case where the optical lens is built into the lens unit. Further, a region where the concave portion is not provided in the flange portion includes the location where the resin directly flows from the gate into the injection molding mold, whereby the resin smoothly flows into the injection molding mold without being obstructed by the convex portion of the injection molding mold.

Preferably, in the optical lens, if a thickness of the thinnest portion is T1, a thickness of the flange portion in the concave portion is T2, an area of the flange portion in a case where it is assumed that the concave portion is not provided on a surface on which the concave portion is provided in the flange portion is S1, and an area occupied by the concave portion on the surface on which the concave portion is provided in the flange portion is S2, the following are satisfied: T2/T1≤(8/3)×(S2/S1)−0.2, T2/T1≥0.6, and S2/S1≤0.6.

According to the aspect, the optical lens (particularly the optical function portion) is molded with high accuracy, and has favorable optical characteristics. In addition, the "area" described herein is an area which is obtained by projecting the corresponding location into a plane which is perpendicular to the optical axis.

Preferably, a central angle, which is formed by two lines connecting the center of the optical axis and two respective end portions of the concave portion disposed at a position where a central point of the cut section is interposed therebetween in a case where the cut section is viewed from the direction of the optical axis of the optical lens, is equal to or less than 60°.

As described in the aspect, a central angle, which is formed between the optical axis center and the end portions of the concave portion, may be equal to or less than 60°. In this case, it is possible to form the optical function portion having desired optical characteristics with high accuracy.

Preferably, a thickness of the flange portion in the concave portion is equal to or less than 1.4 times a thickness of the thinnest portion.

More preferably, the thickness of the flange portion in the concave portion is equal to or less than 1.2 times the thickness of the thinnest portion.

According to the aspect, the optical lens (particularly, the optical function portion) is molded with high accuracy, and has favorable optical characteristics.

Preferably, an inner peripheral surface of the concave portion is oblique to a direction which is perpendicular to the surface on which the concave portion is provided in the flange portion.

Preferably, an angle of inclination a formed between the inner peripheral surface of the concave portion and a direction, which is perpendicular to the surface on which the concave portion is provided in the flange portion, satisfies $0<\alpha\leq 15°$.

According to the aspect, a property of releasing the optical lens from the injection molding mold is improved.

Preferably, a shape, which is viewed from the direction of the optical axis of the concave portion on the surface on which the concave portion is provided in the flange portion, has a curve shape at an end portion at least close to the cut section between end portions of the concave portion in a circumferential direction of the flange portion.

For example, if the end portion of the concave portion in the circumferential direction of the flange portion has a straight line shape and the end portion of the corresponding convex portion of the injection molding mold has a right-angled portion, the optical lens (flange portion) and the injection molding mold are firmly fixed when the optical lens is molded. Thus, it is difficult to release the lens from the mold. In contrast, as described in the aspect, the end portion of the concave portion in the circumferential direction of the flange portion has a curve shape, and the end portion of the corresponding convex portion of the injection molding mold has also a curve shape in a manner similar thereto. As a result, the property of releasing the optical lens from the injection molding mold is improved.

The "curve shape" described herein is not particularly limited. For example, a shape of an arc of a true circle or an ellipse can be used as the curve shape.

Preferably, the flange portion has a plurality of the concave portions, and the plurality of the concave portions are provided in the flange portion so as to be line-symmetric with respect to an axis passing through the center of the optical axis of the optical lens and the center of the cut section in the flange portion.

According to the aspect, disturbance of the fluid state of the resin, which flows into the injection molding mold, is effectively prevented. Thus, it is possible to favorably control "the fluid state of the resin which flows to the location where the optical function portion including the thinnest portion of the optical lens is formed in the injection molding mold" and "the fluid state of the resin which flows to the location where the flange portion of the optical lens is formed in the injection molding mold".

Another aspect of the present invention relates to a lens unit comprising at least one optical lens mentioned above, in which at least a part of a region other than the concave portions on surfaces having the concave portions of the flange portion of the optical lens is in contact with any of a different optical lens, a light blocking plate, a lens barrel, and a spacing ring.

According to the aspect, it is possible to provide the lens unit equipped with the optical lens having favorable optical characteristics.

Another aspect of the present invention relates to an imaging module comprising: the lens unit; and an imaging element that captures an image of a subject through the optical lens of the lens unit.

According to the aspect, by using the optical lens having favorable optical characteristics, an image of a subject is captured. Thus, it is possible to acquire imaging data having high image quality.

Preferably, a pixel pitch of the imaging element is equal to or less than 1 µm.

Generally, as the pixel pitch of the imaging element decreases, the accuracy in positioning between the optical lens (lens unit) and the imaging element increases. In particular, in a case where "the pixel pitch of the imaging element is equal to or less than 1 µm", positional deviation between the optical lens (lens unit) and the imaging element tends to have an adverse effect on the image quality of the acquired imaging data.

That is, as the number of pixels increases, the pixel pitch of the imaging element decreases, and an area per one pixel decreases. For this reason, if the pixel pitch decreases, a radius of the permissible circle of confusion decreases, and a focal depth thereof decreases. Thus, it is necessary to increase an amount of concentrated light per one pixel. As a result, a required F number of the lens also tends to decrease. Consequently, in a case where "the pixel pitch of the imaging element is equal to or less than 1 µm", the focal depth decreases greatly, and high accuracy is necessary for the positioning between the lens unit and the imaging element unit.

Accordingly, as described in the aspect, it is preferable that the optical lens having favorable optical characteristics is mounted on the imaging module having the imaging element of which the pixel pitch is equal to or less than 1 µm.

Here, the pixel pitch means a shortest distance of distances between centers of photoelectric conversion regions included in pixels belonging to the imaging element.

Another aspect of the present invention relates to an electronic apparatus having the imaging module.

According to the aspect, it is possible to provide the electronic apparatus which is able to acquire the imaging data having high image quality.

The "electronic apparatus" described herein is not particularly limited. Examples of the electronic apparatus may include a smartphone, a mobile phone, a tablet terminal, a portable information terminal (PDA: Personal Digital Assistant), an eyeglass-type information terminal, a portable game machine, a portable music player, a camera-equipped clock (wristwatch-type equipment, or the like), a PC, and the like.

Another aspect of the present invention relates to an injection molding mold for molding an optical lens by injecting resin from an opening of a gate, the injection molding mold having: a first mold that forms a front side of the optical lens; and a second mold that forms a rear side of the optical lens, in which each of the first mold and the second mold has an optical molding portion, which molds an optical function portion of the optical lens, and a flange molding portion which molds a flange portion formed around the optical function portion of the optical lens, in which in a space formed by the first mold and the second mold, in a case where the following are viewed from a direction of an optical axis of the optical lens, a thinnest location in a region surrounded by two lines, which connect both ends of a part of the flange molding portion to which the gate is connected and a center of an optical axis of the optical lens in the optical molding portion, and a single line, which connects both ends of the part of the flange molding portion to which the gate is connected, is present in the optical molding portion, and in which the flange molding portion of at least one of the first mold or the second mold has a convex portion outside the region.

According to the aspect, by the convex portion of the injection molding mold avoiding flowage of the resin in the flange molding portion, the resin is prompted to flow into the optical molding portion of the injection molding mold. As described above, the injection molding mold according to the aspect is used to mold the optical lens by controlling "the fluid state of the resin which flows into the optical molding portion" and "the fluid state of the resin which flows into the flange molding portion". Therefore, it is possible to form the optical function portion having desired optical characteristics with high accuracy.

Preferably, the optical lens is molded by using the first mold and the second mold of which one is fixed and the other moves to overlap therewith, and the convex portion is provided on the movable one of the first mold and the second mold.

In the mold on which the convex portion is provided, an area, in which the mold comes into contact with the resin at the time of molding, is larger than that of the mold on which the convex portion is not provided. Accordingly, in a case where the resin is solidified and the mold is separated therefrom at the time of molding, the optical lens formed of the solidified resin tends to be separated from "the mold on which the convex portion is not provided", the mold having a small area in which the mold comes into contact with the resin, and to be attached to "the mold on which the convex portion is provided", the mold having a large area in which the mold comes into contact with the resin. Consequently, as described in the aspect, the configuration is advantageous in that it is easy to obtain the optical lens in a state where it is attached to the movable mold when the first mold and the second mold are separated, by providing the convex portion on the movable one of the first mold and the second mold.

Another aspect of the present invention relates to an injection molding method of molding an optical lens by injecting resin into the injection molding mold.

According to the aspect, it is possible to form an optical lens having favorable optical characteristics.

According to the present invention, the convex portion of the injection molding mold prevents the resin for forming the flange portion of the optical lens from flowing at the time of molding, whereby the resin is prompted to flow into "the location where the optical function portion including the thinnest portion of the optical lens is formed" in the injection molding mold. As a result, it is possible to obtain the optical lens including the optical function portion having excellent optical characteristics.

BRIEF DESCRIPTION OF THE DRAWINGS

FIG. 12 is a table showing a relationship between quality evaluation and conditions of the optical lens (sample nos. 1 to 7) that is discussed in Example 1.

FIG. 13 is a table showing conditions of the optical lens (sample nos. 8 to 12) that is discussed in Example 2.

FIG. 14A is a table showing conditions of the optical lens 10 (sample nos. 13 to 17) that is discussed in Example 3.

DESCRIPTION OF THE PREFERRED EMBODIMENTS

Hereinafter, referring to accompanying drawings, an embodiment of the present invention will be described.

The optical lens to be described later is a relatively small-size lens, and is appropriately used as a lens used in imaging modules mounted on mobile devices such as a mobile phone having an imaging function, but may be used in another optical device. Further, a plurality of the optical lenses to be described later may be combined and appropriately used in the optical device, but a single optical lens may be used.

Figure 1:
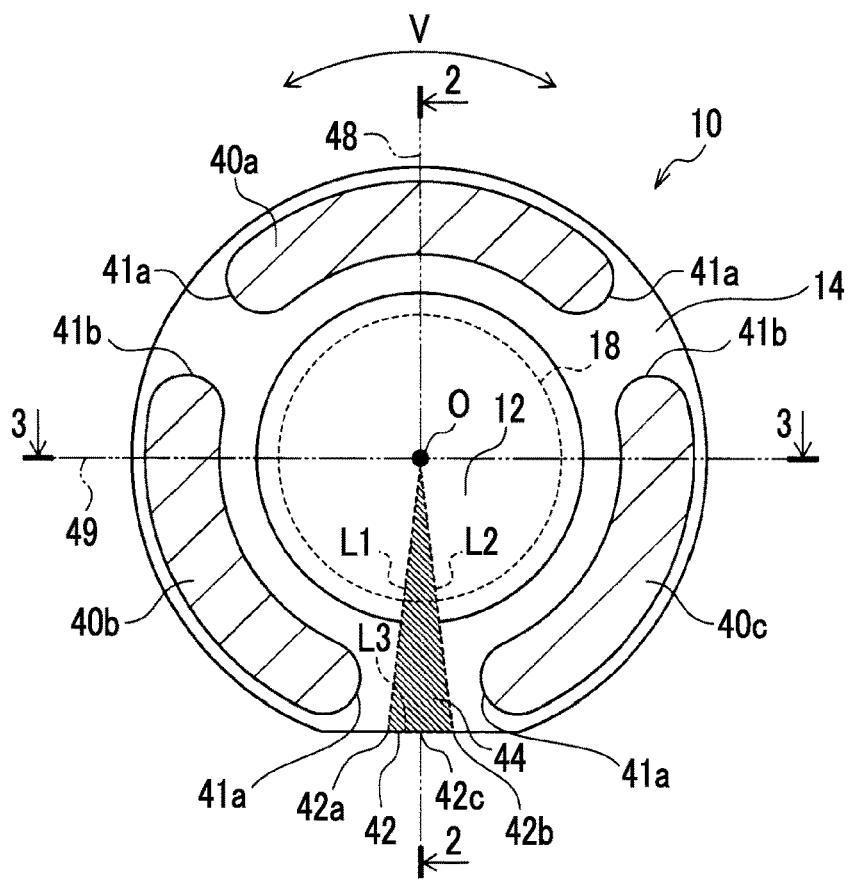
FIG. 1 is a plan view of a rear surface of an optical lens, which is formed by a molding method according to an embodiment of the present invention, as viewed from the optical axis direction.
Figure 2:
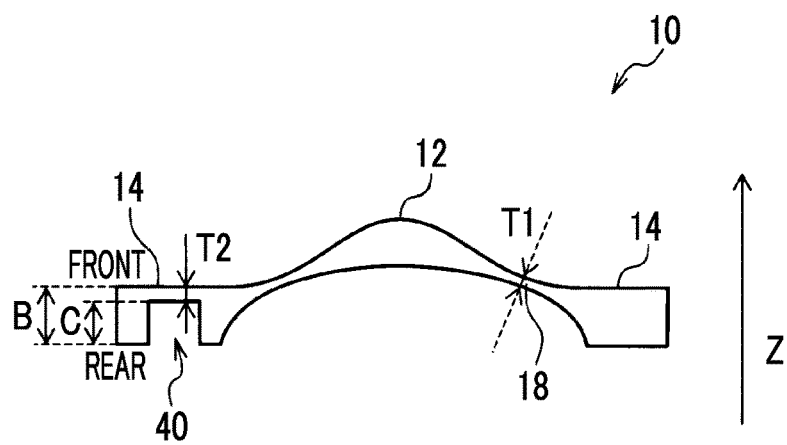
FIG. 2 is a cross-sectional view of the optical lens taken along the sectional line 2-2 of FIG. 1.
Figure 3:
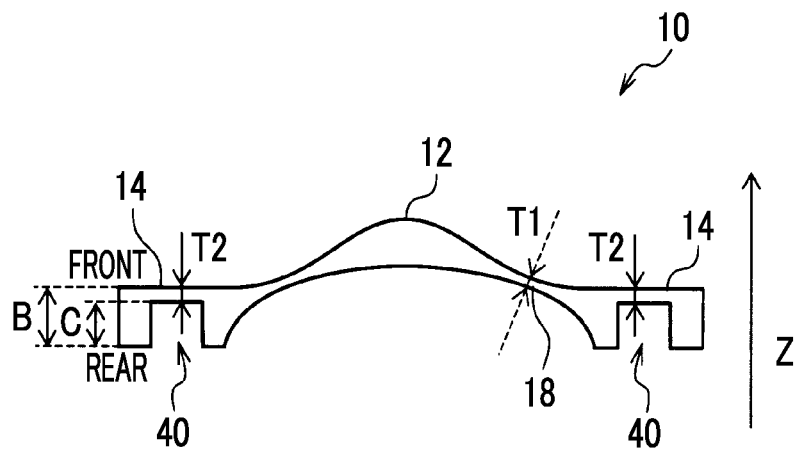
FIG. 3 is a cross-sectional view of the optical lens taken along the sectional line 3-3 of FIG. 1.

FIG. 1 is a plan view of a rear surface of an optical lens 10, which is formed by a molding method according to an embodiment of the present invention, as viewed from the optical axis direction. FIG. 2 is a cross-sectional view of the optical lens 10 taken along the sectional line 2-2 (first axis 48) of FIG. 1. FIG. 3 is a cross-sectional view of the optical lens 10 taken along the sectional line 3-3 (second axis 49) of FIG. 1.

The optical lens 10 comprises: an optical function portion 12 having optical functions; and a flange portion 14 formed around the optical function portion 12. The optical function portion 12 is a part that is responsible for the optical characteristics of the lens, and the optical function portion 12 is disposed at a position where light passes in a state where it is built into devices such as the imaging module. Consequently, in the imaging module (refer to FIGS. 18 to 20) and a smartphone (refer to FIGS. 21 to 22) to be described later, a part of the optical lens 10, through which light passes in a state where the optical lens 10 is built into a lens barrel, corresponds to the optical function portion 12.

The flange portion 14 has a cut section 42 which is obtained by cutting a gate portion 16 (refer to FIG. 4), as a side surface, a plurality of (three in the present example) concave portions 40a, 40b, and 40c (hereinafter, the concave portions 40a, 40b, and 40c are collectively referred to as "concave portions 40") on the rear surface. All the concave portions 40a, 40b, and 40c of the present example have the same shapes, and may have different shapes.

In a case where the following are viewed from a optical axis direction Z of the optical lens 10, a thinnest portion 18 in a region (hereinafter referred to as "a first region") 44 surrounded by two lines L1 and L2, which respectively connect both end portions 42a and 42b of the cut section 42 to an optical axis center O of the optical lens 10, and a single line L3, which connects both end portions 42a and 42b of the cut section 42, is present in the optical function portion 12. In the present example, the thinnest portion 18 is provided to have a circular shape over the entire circumference of the optical function portion 12, and the thinnest portion 18 is disposed at the position where rays pass in a state where the optical lens 10 is built into devices such as the imaging module.

A plurality of concave portions 40 provided on the flange portion 14 is provided outside a first region 44 closer to the outer periphery side than the thinnest portion 18, and is provided to be line-symmetric with respect to an axis (hereinafter referred to as "a first axis") 48 passing through the optical axis of the optical lens 10 and the center 42c of the cut section 42 in the flange portion 14. In the example shown in FIG. 1, two concave portions 40b and 40c are positioned to be line-symmetric with respect the first axis 48, and the rest one concave portion 40a provided between the two concave portions 40b and 40c is positioned to be line-symmetric with respect to the first axis 48. Accordingly, the two concave portions 40b and 40c are positioned to be equidistant from the rest one concave portion 40a in a circumferential direction V of the flange portion 14. In addition, an axis, which is perpendicular to the first axis 48 and passes through the optical axis of the optical lens 10, is referred to as a second axis 49.

Preferably, "a shape of the concave portion 40 viewed from the optical axis direction Z" on the rear surface, on which the concave portion 40 is provided in the flange portion 14, is a curve shape at an end portion 41a at least close to the cut section 42 between end portions of the concave portion 40 in the circumferential direction V of the flange portion 14. In the example shown in FIG. 1, both end portions of each concave portion 40 have curve shapes. The end portion close to the cut section 42 is represented by the reference sign "41a", and the end portion far from the cut section 42 is represented by the reference sign "41b". Both end portions of the concave portion 40a, which is positioned to be line-symmetric with respect to the first axis 48, are equidistant from the cut section 42, and are represented by the reference sign "41a". As described above, the end portions (at least the end portions 41a close to the cut section 42) of the concave portions 40 have curve shapes, and thus the property of releasing the injection molding mold 20 from the optical lens 10 at the time of a molding process using the injection molding mold 20 (refer to FIG. 6 to be described later) is improved.

As a result of a keen examination, the inventor of the present invention founds that the optical lens 10, which satisfies conditions to be described later, is preferable.

That is, as can be clearly seen from Example 3 (refer to FIGS. 14A to 16), if a thickness of the thinnest portion 18 is T1, a thickness of the flange portion 14 in the concave portion 40 is T2, an area of the flange portion 14 in a case where it is assumed that the concave portion 40 is not provided on a surface on which the concave portion 40 should be provided in the flange portion 14 is S1, and an area occupied by the concave portion 40 on the surface on which the concave portion 40 is provided in the flange portion 14 is S2, it is preferable that the optical lens 10 satisfies the following Expressions 1 to 3.

$$T2/T1 \le (8/3) \times (S2/S1) - 0.2 \qquad \text{(Expression 1)}$$

$$T2/T1 \ge 0.6 \qquad \text{(Expression 2)}$$

$S2/S1 \leq 0.6$ (Expression 3)

In the present example, the thinnest portion 18 is at a location where the optical function portion 12 is thinnest, and the thickness T1 of the thinnest portion 18 indicates a thickness of the optical function portion 12 at the location where it is thinnest. Further, the thickness T2 of the flange portion 14, at the position where the concave portion 40 is provided, is represented by a difference between a depth C of the concave portion 40 in the optical axis direction Z and a thickness B of the flange portion 14 in the optical axis direction Z at the position where the concave portion 40 is not provided (T2=B−C).

Further, as can be clearly seen from Example 1 (refer to FIG. 12) to be described later, the thickness T2 of the flange portion 14 in the concave portion 40 of the optical lens 10 is preferably equal to or less than 1.4 times the thickness T1 of the thinnest portion 18 (T2≤T1×1.4), and more preferably equal to or less than 1.2 times the thickness T1 of the thinnest portion 18 (T2≤T1≤×1.2).

Furthermore, the cut section 42 is a portion which is formed on a side surface of the flange portion 14 by separating the gate portion 16 from the optical lens 10, but a method of separating the gate portion 16 from the optical lens 10 is not particularly limited.

Figure 4:
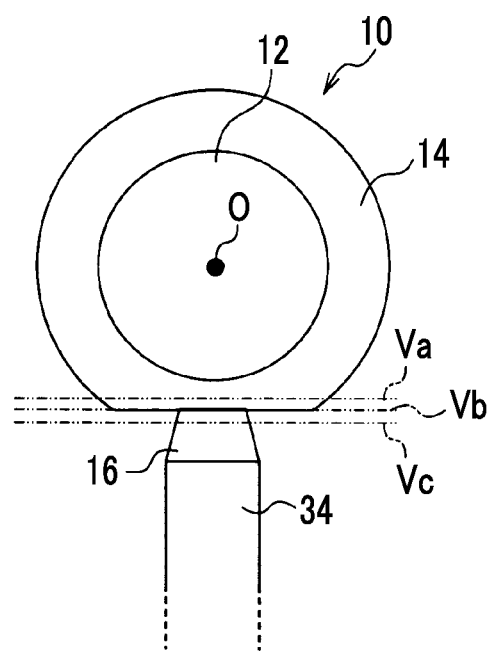
FIG. 4 is a diagram illustrating an example of a position where a gate portion is separated from the optical lens.

FIG. 4 is a diagram illustrating an example of a position where the gate portion 16 is separated from the optical lens 10.

Generally, the optical lens 10 is molded by supplying the resin to the injection molding mold 20 to be described later through a sprue, a runner, and a gate, and the optical lens 10 is molded in a state where a sprue portion formed of the resin within the sprue, a runner portion 34 formed of the resin within the runner, and the gate portion 16 formed of the resin within the gate are integrally added thereto. In the example shown in FIG. 4, only the optical lens 10, the gate portion 16, and the runner portion 34 are shown, and the sprue portion is not shown.

As a method of separating the gate portion 16, the runner portion 34, and the sprue portion (not shown in the drawing) from the optical lens 10, there are the following cases: a case of performing cutting at the boundary between the gate portion 16 and the optical lens 10 (refer to a sectional line "Vb" of FIG. 4); a case of performing cutting at a position closer to the optical lens 10 than the boundary between the gate portion 16 and the optical lens 10 (refer to a sectional line "Va" of FIG. 4); and a case of performing cutting at a position closer to the gate portion 16 than the boundary between the gate portion 16 and the optical lens 10 (refer to a sectional line "Vc" of FIG. 4). For example, in the case of performing cutting at the boundary between the gate portion 16 and the optical lens 10 (refer to the sectional line "Vb" of FIG. 4), the first region 44, which is defined by lines L1 to L3 passing through the optical axis center O and the end portions 42a and 42b of the cut section 42, is as shown in FIG. 1. In this case, a location on the side surface of the flange portion 14 where the gate portion 16 is provided corresponds to "the cut section 42".

Figure 5A:
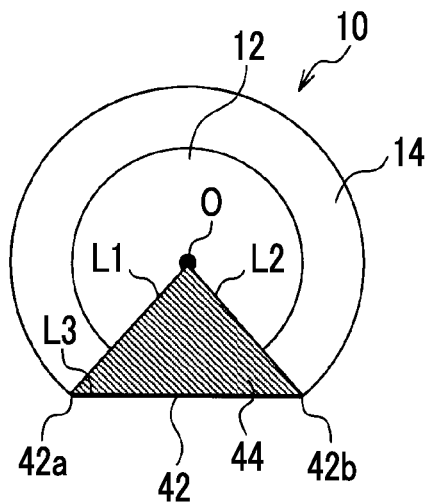
FIG. 5A is a diagram illustrating an example of a cut section.

In contrast, in the case of performing cutting at a position closer to the optical lens 10 than the boundary between the gate portion 16 and the optical lens 10 (refer to the sectional line "Va" of FIG. 4), the cut section 42 is provided on a part of the flange portion 14 of the optical lens 10, and the first region 44 is as shown in FIG. 5A. In this case, the entire location where the flange portion 14 is cut corresponds to "the cut section 42".

Figure 5B:
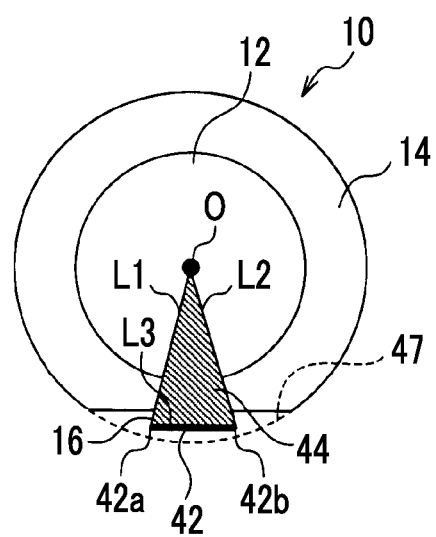
FIG. 5B is a diagram illustrating an example of the cut section.

Further, in the case of performing cutting at a position closer to the gate portion 16 than the boundary between the gate portion 16 and the optical lens 10 (refer to the sectional line "Vc" of FIG. 4), the cut section 42 is provided on a part of the gate portion 16, and the first region 44 is as shown in FIG. 5B. In this case, the entire location where the gate portion 16 is cut corresponds to "the cut section 42". Furthermore, in the example shown in FIG. 5B, in a case where it is assumed that, the outer periphery of the flange portion 14 has a true circular shape centered on the optical axis center O, the cut section 42 is provided to be closer to the optical axis center O than an outer periphery line (virtual flange outer periphery line) 47.

Even if a position where the gate portion 16, the runner portion 34, and the sprue portion (not shown in the drawing) are separated from the optical lens 10 is any position (refer to FIGS. 1 and 4, and FIGS. 5A and 5B), the concave portions 40 of the optical lens 10 are provided outside the first region 44 which is defined by the cut section 42 and the optical axis center O. Thereby, the resin, which is flowed into the injection molding mold 20 to be described later, is not obstructed by the convex portions 50 provided on the injection molding mold 20, and reliably smoothly flows into the injection molding mold 20. Further, it is preferable that the first region 44 includes a part corresponding to a location to which the resin directly flows from the gate 26 to be described later in the injection molding mold 20 (resin inflow space 28), and a location larger than the location, to which the resin directly flows, may be the first region 44.

Next, the injection molding mold 20 for molding the optical lens 10 will be described.

Figure 6:
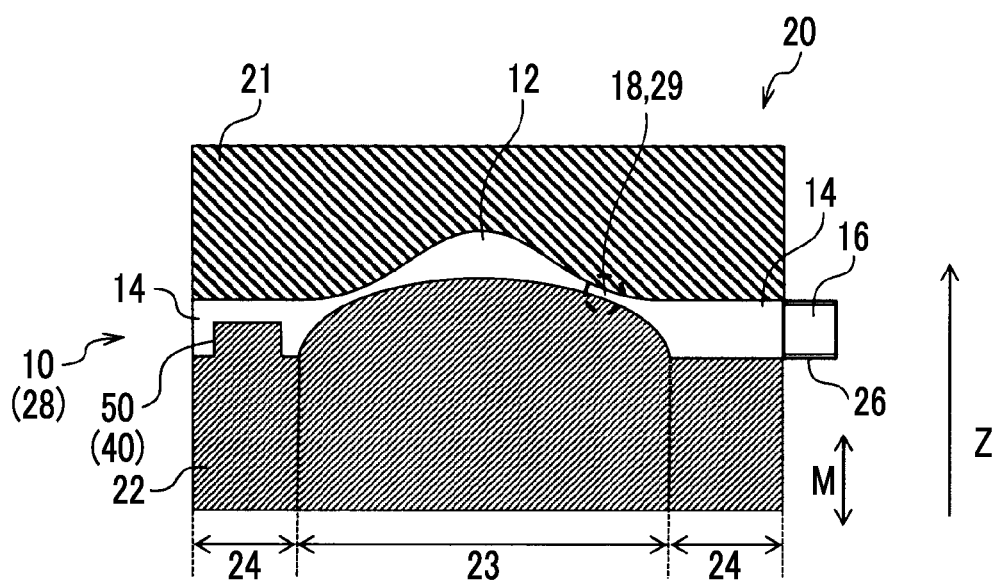
FIG. 6 is a cross-sectional view illustrating an example of an injection molding mold for molding the optical lens which is shown in FIGS. 1 to 3.

FIG. 6 is a cross-sectional view illustrating an example of the injection molding mold 20 which is used when molding the optical lens 10 shown in FIGS. 1 and 3.

The injection molding mold 20 comprises a first mold 21 for molding the front side of the optical lens 10 and a second mold 22 for molding the rear side of the optical lens 10. In the injection molding mold 20 of the present example, the resin is injected from the opening of the gate 26 into a space (resin inflow space) 28 to which the gate 26 is connected and which is formed between the first mold 21 and the second mold 22, whereby the optical lens 10 is molded.

As the resin which is injected from the gate 26 into the resin inflow space 28 so as to form the optical lens 10, thermoplastic resin is preferably used, but the resin is not particularly limited. As examples of the resin which forms the optical lens 10, cyclo olefin copolymer (COC), cyclo olefin polymer (COP), acryl, polycarbonate, and the like are used, and commercially available APEL (registered trademark) 5514 ML (manufactured by Mitsui Chemicals, Inc.) and the like are preferably used.

Each of the first mold 21 and the second mold 22 has the optical molding portion 23, which molds the optical function portion 12 of the optical lens 10, and the flange molding portion 24 which molds the flange portion 14 formed around the optical function portion 12 of the optical lens 10. The optical lens 10 is molded by using the first mold 21 and the second mold 22 of which one (in the present example, the first mold 21) is fixed and the other (in the present example, the second mold 22) moves (refer to the arrow "M" of FIG. 6) to overlap therewith.

The flange molding portion 24 of at least one of the first mold 21 or the second mold 22 has the convex portions 50 for molding the concave portions 40 (refer to FIG. 1) of the optical lens 10, and in the present example, the convex portions 50 are provided on the flange molding portion 24 of the second mold 22 which is movable at the time of molding.

Figure 7:
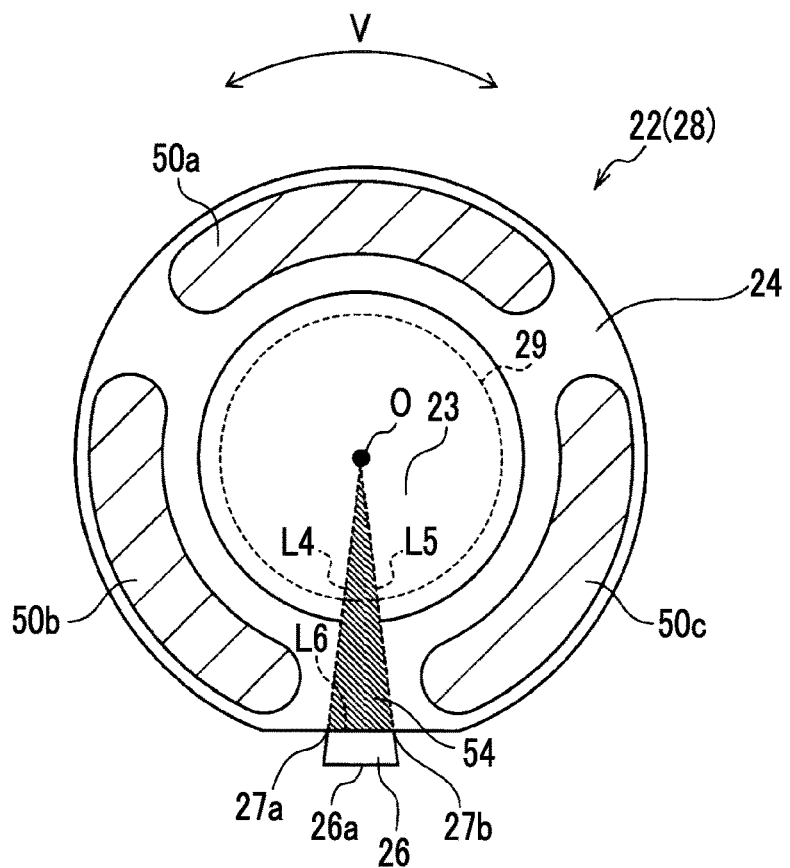
FIG. 7 is a plan view of a surface, on which convex portions are provided, in the second mold, as viewed from the optical axis direction.

FIG. 7 is a plan view of a surface, on which the convex portions 50 are provided, in the second mold 22, as viewed from the optical axis direction.

The convex portions 50 of the injection molding mold 20 and the concave portions 40 of the optical lens 10 correspond to each other and are provided such that the numbers of those are the same. Hence, a plurality of (in the present example, three) the convex portions 50a, 50b, and 50c (hereinafter the convex portions 50a, 50b, and 50c are collectively referred to as "the convex portions 50") is provided on the second mold 22 of the injection molding mold 20 for molding the optical lens 10 which is shown in FIGS. 1 to 3.

Accordingly, in the resin inflow space 28 which is formed between the first mold 21 and the second mold 22, in a case where the following are viewed from the optical axis direction Z of the optical lens 10, a location (thinnest portion molding section) 29 where the optical lens 10 is thinnest in a region (hereinafter referred to as "a second region") 54 is present in the optical molding portion 23, and thus the thinnest portion 18 of the optical lens 10 is molded. The region 54 is surrounded by two lines L4 and L5, which respectively connect both ends 27a and 27b of a part of the flange molding portion 24 to which the gate 26 is connected and the position O corresponding to the optical axis center of the optical lens 10 in the optical molding portion 23, and a single line L6 which connects both ends 27a and 27b of the part of the flange molding portion 24 to which the gate 26 is connected. Further, the convex portions 50 of the flange molding portion 24 are provided outside the second region 54, and are provided to be symmetric with respect to an axis which passes through the center of both ends 27a and 27b of the part of the flange molding portion 24, to which the gate 26 is connected, and the position O which corresponds to the optical axis center of the optical lens 10 in the optical molding portion 23. Furthermore, in FIG. 7, the boundary portion between the gate 26 and the runner (not shown in the drawing) is represented by the reference sign "26a".

The second region 54 is a space in which the resin directly flows from the gate 26 into the resin inflow space 28. Therefore, in terms of reliably smoothly flowing the resin from the gate 26, it is preferable to secure the second region 54 which is as large as possible. Consequently, by providing the convex portions 50 outside the second region 54 in a manner similar to that of the present embodiment, the convex portions 50 are prevented from obstructing the inflow of the resin from the gate 26, and the resin can be smoothly supplied from the gate 26 to the resin inflow space 28.

Figure 8:
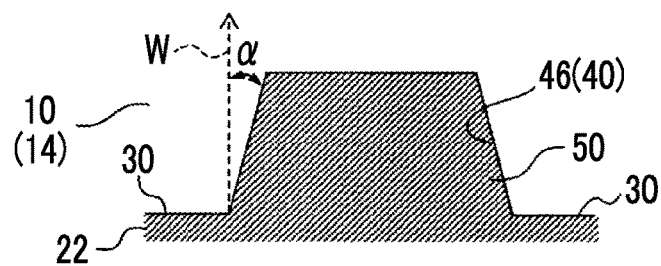
FIG. 8 is a diagram illustrating the convex portion shown in FIG. 6 in an enlarged manner.

FIG. 8 is a diagram illustrating the convex portion 50 shown in FIG. 6 in an enlarged manner. The outer peripheral surface of each convex portion 50 of the injection molding mold 20 (second mold 22) is oblique to a direction W which is perpendicular to a surface (hereinafter referred to as "a flange surface") 30 on which the concave portion 40 is provided in the flange portion 14. In other words, an inner peripheral surface 46 of the concave portion 40 of the optical lens 10, which is molded by the injection molding mold 20, is oblique to the direction W which is perpendicular to the flange surface 30. As described above, by inclining the inner peripheral surface 46 of the concave portion 40 and the peripheral surface of the convex portion 50, the property of releasing the injection molding mold 20 from the optical lens 10 is improved. The angle of inclination a is an angle of the inner peripheral surface 46 of the concave portion 40 and the outer peripheral surface of the convex portion 50 with respect to the direction W which is perpendicular to the flange surface 30. In terms of securing excellent releasing property, it is preferable that the angle of inclination a satisfies $0 < \alpha \leq 15°$.

Figure 9:
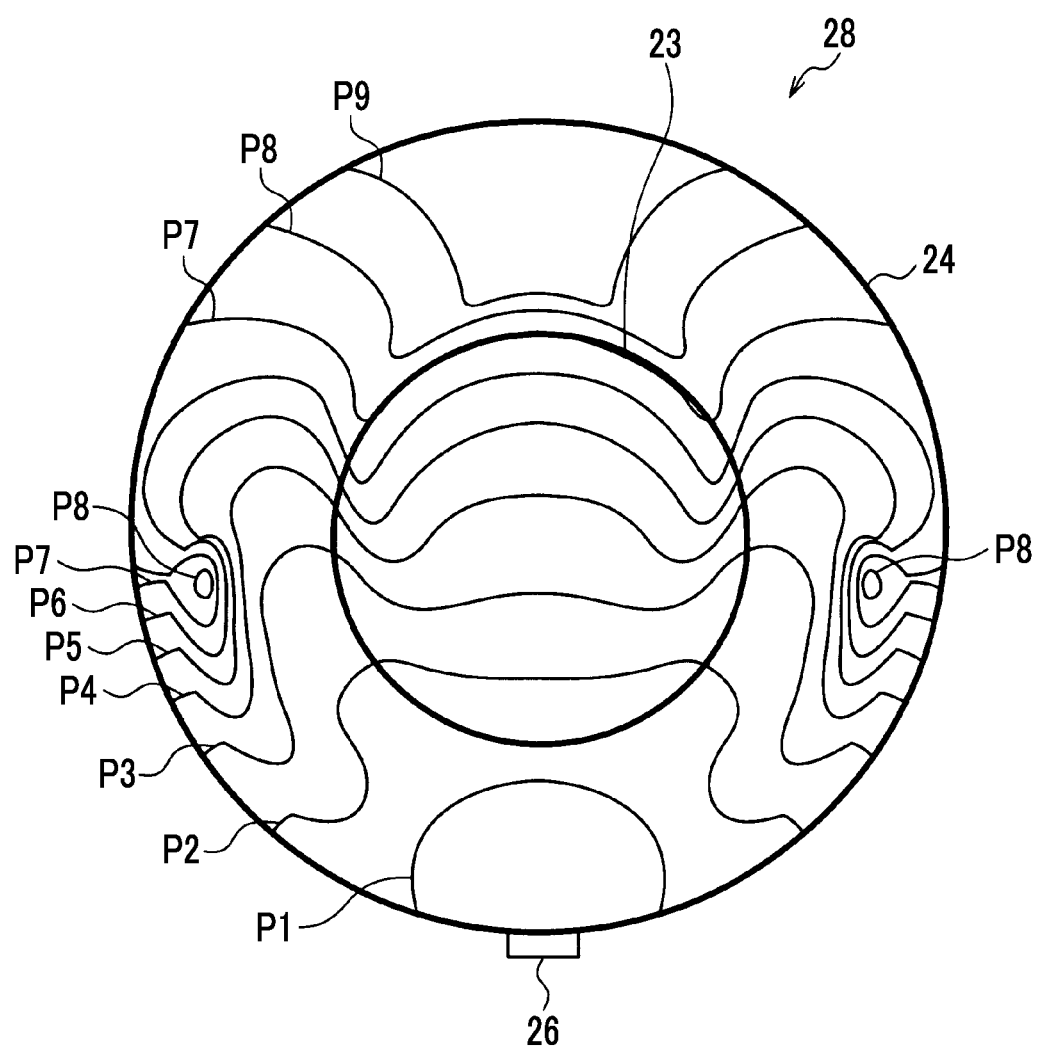
FIG. 9 is a plan view of a resin inflow space, which is formed between the first mold and the second mold shown in FIGS. 6 to 8, as viewed from a direction (the optical axis direction of the optical lens) of the arrow "Z" of FIG. 6, and shows an example of positions to which the resin flows in accordance with elapse of time.

FIG. 9 is a plan view of the resin inflow space 28, which is formed between the first mold 21 and the second mold 22 shown in FIGS. 6 to 8, as viewed from a direction (the optical axis direction of the optical lens 10) of the arrow "Z" of FIG. 6, and shows an example of positions to which the resin flows in accordance with elapse of time. "P1" to "P9" in FIG. 9 indicate the temporal positions of the resin flowed from the gate 26 into the resin inflow space 28. The "P1" indicates a boundary position of the resin from start of inflow of the resin after passage of a first time period. The "P2" indicates a boundary position of the resin from the start of the inflow of the resin after passage of a second time period (here, first time period<second time period). Likewise, the "P3" to "P9" also indicate the boundary positions of the resin in the time period from the start of the inflow of the resin.

Figure 26:
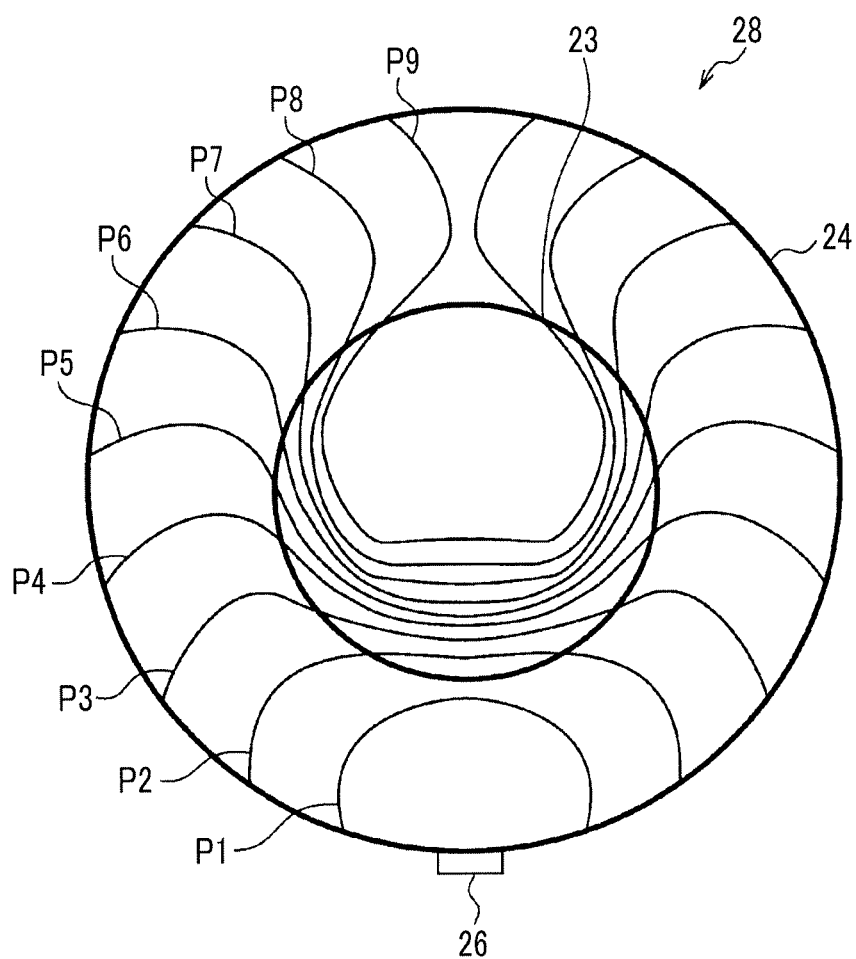
FIG. 26 is a plan view of a resin inflow space, which is formed between the first mold and the second mold shown in FIG. 25, as viewed from a direction (the optical axis direction of the optical lens) of the arrow "Z" of FIG. 25, and shows an example of positions to which the resin flows in accordance with elapse of time.

According to the injection molding mold 20 of the present embodiment, the resin, which is flowed from the gate 26 into the resin inflow space 28, is unlikely to "spread only along the flange molding portion 24 (refer to FIG. 26)". That is, the boundary position of the resin flowing into the resin inflow space 28 is gradually separated from the gate 26 in accordance with passage of time, on both the optical molding portion 23 and the flange molding portion 24, the resin broadly spreads in and fills the optical molding portion 23, and thereafter the resin broadly spreads to the flange molding portion 24 which is positioned on a side opposite to the gate 26.

The reason for this is as follows. The convex portions 50 provided on the second mold 22 effectively prompts the resin to flow into the optical molding portion 23 by narrowing spacing of the resin inflow space 28 at a position where the convex portions 50 are provided in the flange molding portion 24 and preventing the resin from preferentially flowing along the flange molding portion 24.

Accordingly, at the time of molding the optical lens 10, air in the optical molding portion 23 of the injection molding mold 20 is pushed toward the flange molding portion 24 by the resin flowing into the optical molding portion 23, whereby the air is prevented from being incorporated into the optical function portion 12 of the optical lens 10. As a result, it is possible accurately mold the optical function portion 12. Further, the boundary position of the resin, which proceeds into the flange molding portion 24, is not remarkably different from the boundary position of the resin which flows into the optical molding portion 23. Thus, it is possible to effectively prevent defects such as weld lines from occurring in the optical lens 10 (particularly, the optical function portion 12).

The inventors of the present invention verify various characteristics by performing actual tests on the above-mentioned optical lens 10 and the above-mentioned injection molding mold 20. Hereinafter, specific examples relating to molding of the optical lens 10 using the injection molding mold 20 will be described.

Figure 10:
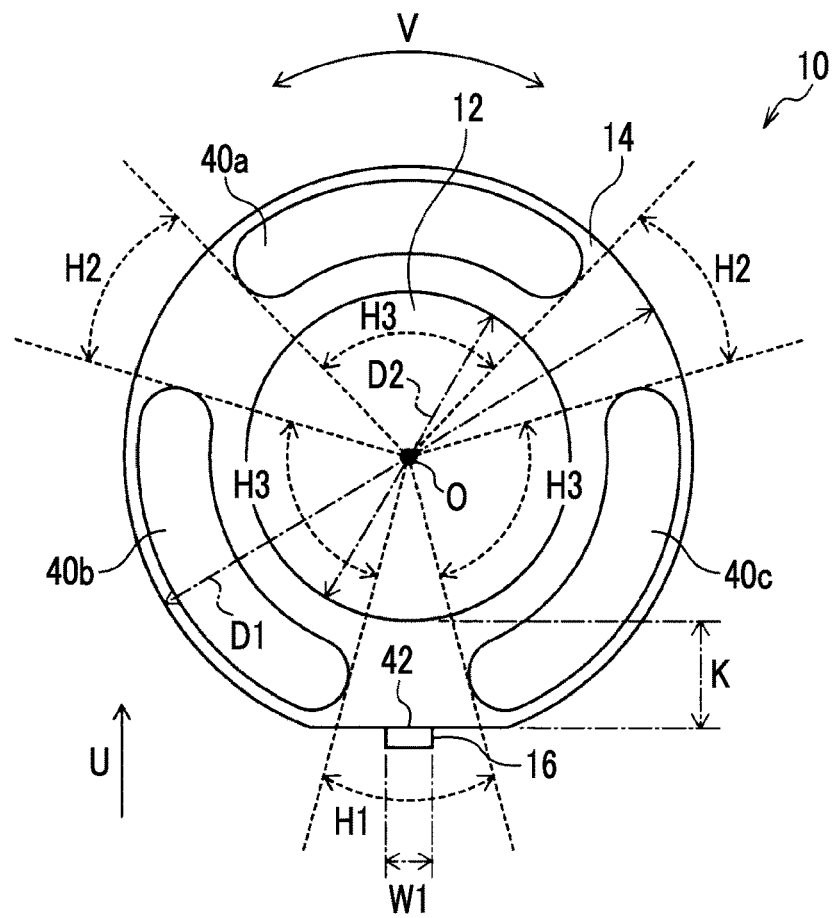
FIG. 10 is a plan view of the rear surface of the optical lens used in Examples 1 to 3, as viewed from the optical axis direction.
Figure 11:
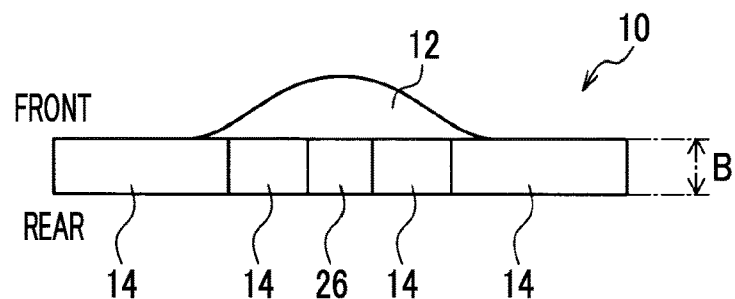
FIG. 11 is a side view of the optical lens shown in FIG. 10, as viewed from a direction of the arrow U shown in FIG. 10.

FIG. 10 is a plan view of the rear surface of the optical lens 10 used in Examples 1 to 3, as viewed from the optical axis direction. FIG. 11 is a side view of the optical lens 10 shown in FIG. 10, as viewed from a direction of the arrow U shown in FIG. 10. In Examples 1 to 3 to be described below, a study was made of the optical lens 10 shown in FIGS. 10 and 11.

A diameter D1 of the optical lens 10 is 5.3 mm, a diameter D2 of the optical function portion 12 is 3 mm, and a thickness B of the flange portion 14 in the optical axis direction is 0.50 mm. A part of the flange portion 14, on which the gate portion 16 is provided, is notched, an opening width W1 of the gate portion 16 is 0.6 mm, an opening length of the gate portion 16 in the optical axis direction is 0.5 mm, and a distance K between the optical function portion 12 and a part of the flange portion 14 to which the gate portion 16 is connected is 0.95 mm. Further, the cut section 42 is formed on "the part of the flange portion 14 to which the gate portion 16 is connected" as the boundary portion between the flange portion 14 and the gate portion 16.

The three concave portions 40a, 40b, and 40c having the same shapes are provided on the flange portion 14, and a central angle H3, which is formed by two straight lines respectively connecting both ends of each of the concave portions 40a, 40b, and 40c to the optical axis center O, is common to the concave portions 40a, 40b, and 40c. Further, the second concave portion 40b and the third concave portion 40c, which are provided with the first concave portion 40a interposed therebetween, are positioned to be equidistant from the first concave portion 40a in the circumferential direction V of the flange portion 14. A central angle H2, which is formed by two straight lines respectively connecting the end portion of the first concave portion 40a and the end portion of the second concave portion 40b to the optical axis center O, is equal to a central angle H2, which is formed by two straight lines respectively connecting the end portion of the first concave portion 40a and the end portion of the third concave portion 40c to the optical axis center O. Furthermore, a central angle, which is formed by two straight lines respectively connecting the end portion of the second concave portion 40b close to the gate portion 16 and the end portion of the third concave portion 40c close to the gate portion 16 to the optical axis center O, is represented by the reference sign "H1". Accordingly, the reference sign "H1" indicates a central angle that is formed by two lines respectively connecting the optical axis center O to two end portions (the end portions of the second concave portion 40b and the third concave portion 40c in the example shown in FIG. 10) of the concave portions 40 positioned with the central point of the cut section 42 interposed therebetween in a case where the above portions are viewed from the optical axis direction of the optical lens 10. In a case where the central angle H1 is equal to or less than 60°, the resin is effectively prompted from flowing to "the location where the optical function portion 12 including the thinnest portion 18 of the optical lens 10 is formed".

A projection area, which is obtained by projecting the entire optical lens 10 in the optical axis direction, was set to 21.7772 mm$^2$, a projection area, which is obtained by projecting the optical function portion 12 in the optical lens 10 in the optical axis direction, was set to 7.056 mm$^2$, and a projection area, which is obtained by projecting the flange portion 14 in the optical lens 10 in the optical axis direction, was set to 14.72 mm$^2$.

Further, the APEL (registered trademark) 5514 ML (manufactured by Mitsui Chemicals, Inc.) was used as the resin for forming the optical lens 10, and a temperature of the resin when the resin is flowed from the gate 26 into the injection molding mold 20 (resin inflow space 28) was set to "270° C.". Further, a speed of the resin, which is flowed from the gate 26 into the injection molding mold 20 (resin inflow space 28), was set to "20 mm/sec", and temperatures of the first mold 21 and the second mold 22 constituting the injection molding mold 20 were kept to be constant at "110° C." throughout.

Example 1

In the present Example 1, a study was made of a relationship of: the thickness "T1" of the thinnest portion 18 of the optical lens 10; a thickness "B" of the flange portion 14 in the optical axis direction Z at the position where the concave portion 40 is not provided; a depth "C" of the concave portion 40 in the optical axis direction Z; a thickness "B–C (=T2)" of the flange portion 14 at the position where the concave portion 40 is provided; a ratio "T2/T1" of "the thickness T2 of the flange portion 14 at the position where the concave portion 40 is provided" to "the thickness T1 of the thinnest portion 18"; and a quality (optical characteristics) of the optical lens 10 (particularly, the optical function portion 12) obtained through molding.

FIG. 12 is a table showing a relationship between quality evaluation and conditions of the optical lens 10 (sample nos. 1 to 7) that is discussed in Example 1. The unit of the numerical value of each of items represented by "T1", "B", "C" and "B–C" of FIG. 12 is "millimeter (mm)".

In each optical lens 10 (sample nos. 1 to 7) which is molded in the present Example 1, the thickness "T1" of the thinnest portion 18, the thickness "B" of the flange portion 14 in the optical axis direction Z at the position where the concave portion 40 is not provided, and the depth "C" of the concave portion 40 in the optical axis direction Z are values shown in FIG. 12.

In each optical lens 10 (sample nos. 1 to 7) which is molded in the present Example 1, optical characteristics, which are represented by the optical function portion 12 of the optical lens 10, were evaluated (refer to "quality evaluation" of FIG. 12).

As the other conditions, the following shown in FIG. 10 were adjusted: the "central angle H1)(°)"; the "central angle H2)(°)"; the "central angle H3)(°)"; the "flange area S1 (cm$^2$)"; and the "concave 1, the concave 2, and the concave 3 (cm$^2$) as areas respectively occupied by the concave portions 40a, 40b, and 40c on the surface (the rear surface of the optical lens 10 of FIG. 10) on which the concave portions 40a, 40b, and 40c are provided in the flange portion 14". Specifically, under conditions shown in each of the sample nos. 8 to 12 shown in FIG. 13 to be described later, optical characteristics, which are represented by the optical function portion 12 of the optical lens 10, were evaluated. Even under any of such conditions shown in FIG. 13, it is possible to obtain the same evaluation result.

That is, in the result of the present Example 1, as shown in FIG. 12, the optical lenses 10 of the sample nos. 1 to 5 had favorable optical characteristics of the optical lens 10 (refer to indications of "good" in the items of "quality evaluation" of FIG. 12). Further, as compared with the optical lenses 10 of the sample nos. 1 to 5, the optical lens 10 of the sample no. 6 had inferior optical characteristics, but showed optical characteristics without practical problems (refer to indications of "normal" in the items of the "quality evaluation" of FIG. 12). In contrast, as compared with the optical lenses 10 of the sample nos. 1 to 6, the optical lens 10 of the sample no. 7 had inferior optical characteristics. Thus, in consideration of practical use in the optical device such as the imaging module, precautions in use was necessary for optical characteristics (refer to indications of "poor" of the items of the "quality evaluation" of FIG. 12).

In other words, the ratio "T2/T1" of "the thickness T2 of the flange portion 14 at the position where the concave portion 40 is provided" to "the thickness T1 of the thinnest portion 18" is preferably in "a range which is equal to or greater than 0.4 and equal to or less than 1.2" on the optical characteristics of the optical lens 10 (refer to sample nos. 1 to 5), and secondary preferably in "a range which is greater than 1.2 and equal to or less than 1.4" (refer to sample nos. 6).

From the result of Example 1, the inventor of the present invention found the following facts. The thickness T2 of the flange portion 14 in the concave portion 40 is preferably equal to or less than 1.4 times the thickness T1 of the thinnest portion 18, more preferably equal to or less than 1.2 times the thickness T1 of the thinnest portion 18.

Example 2

In the present Example 2, in consideration of practical use, a study was made of a limit of a ratio of the area of the concave portions 40 of the optical lens 10 to the area of the flange portion 14.

FIG. 13 is a table showing conditions of the optical lens 10 (sample nos. 8 to 12) that is discussed in Example 2.

The numerical values of the items indicated by "H1", "H2", and "H3" of FIG. 13 represent specific central angles) (°) of "H1", "H2" and "H3" shown in FIG. 10. The "flange area S1 (cm$^2$)" of FIG. 13 indicates the area of the flange portion 14 in a case where it is assumed that the concave portions 40 are not provided on the surface (the rear surface of the optical lens 10 of FIG. 10) on which the concave portions 40 should be provided in the flange portion 14. That is, the projection area, which is obtained by projecting the flange portion 14 including the concave portions 40 in the optical axis direction, corresponds to the "flange area S1 (cm$^2$)" of FIG. 13. The "concave 1 area (cm$^2$)", the "concave 2 area (cm$^2$)", and the "concave 3 area (cm$^2$)" of FIG. 13 indicate areas which are respectively occupied by the concave portions 40$a$, 40$b$, and 40$c$ on the surface (the rear surface of the optical lens 10 of FIG. 10) on which the concave portions 40$a$, 40$b$, and 40$c$ are provided in the flange portion 14. That is, the "concave 1 area (cm$^2$)" of FIG. 13 corresponds to the projection area which is obtained by projecting the first concave portion 40$a$ in the optical axis direction. The "concave 2 area (cm$^2$)" corresponds to the projection area which is obtained by projecting the second concave portion 40$b$ in the optical axis direction. The "concave 3 area (cm$^2$)" corresponds to the projection area which is obtained by projecting the third concave portion 40$c$ in the optical axis direction. The "total concave area S2 (cm$^2$)" of FIG. 13 indicates the sum of the areas which are occupied by the concave portions 40$a$, 40$b$, and 40$c$ on the surface on which the concave portions 40$a$, 40$b$, and 40$c$ are provided in the flange portion 14 (the rear surface of the optical lens 10 of FIG. 10). The "total concave area/flange area" of FIG. 13 indicates "the ratio of the area of the concave portions 40 of the optical lens 10 to the area of the flange portion 14", and indicates values which are obtained by dividing the "total concave area S2 (cm$^2$)" by the "flange area S1 (cm$^2$)".

In the sample no. 12 shown in FIG. 13, only one concave portion 40 is provided on the flange portion 14 of the optical lens 10. The central angle, which is formed by the two straight lines respectively connecting both end portions of the concave portion 40 to the optical axis center O, is represented by the reference sign "H1 (°)", and the area, which is occupied by the concave portion 40 on the rear surface of the flange portion 14 on which the concave portion 40 is provided, is represented by the "concave 1 (cm$^2$)".

In FIG. 13, the conditions of the optical lenses 10 (sample nos. 8 to 12), which can be practically used without any particular problem, are written. In a case where the ratio (refer to items of the "total concave area/flange area" of FIG. 13) of the area of the concave portion 40 of the optical lens 10 to the area of the flange portion 14 is greater than that of the case of sample no. 12 (a numerical value of "0.66" in FIG. 13)" (in a precise sense, in a case where the ratio is greater than "0.6" as shown in FIGS. 14A to 16 to be described later), it was seen that it is necessary to give caution about practical use.

The evaluation about the practical use of the optical lens 10 (sample nos. 8 to 12) shown in FIG. 13 is performed in consideration of "the strength of the optical lens 10" which is estimated on the basis of physical values and "the area of the flange portion 14" which is necessary in a case where the optical lens is built into a kind of the optical device so as to overlap with a different lens.

The inventor of the present invention found the following fact. On the basis of the result of Example 2, the "a total of the areas which are occupied by the concave portions 40 on the surface where the concave portions 40 are provided in the flange portion 14" is preferably equal to or less than 65.7% of "the area of the flange portion 14 in a case where it is assumed that the concave portions 40 are not provided on the surface where the concave portions 40 should be provided in the flange portion 14".

Example 3

In the present Example 3, a study was made of a relationship of "the ratio of the area of the concave portions 40 of the optical lens 10 to the area of the flange portion 14", "the ratio of the thickness of the flange portion 14 to the thickness of the thinnest portion 18 at the positions where the concave portions 40 are provided", and "states of occurrence of weld lines".

FIG. 14A is a table showing conditions of the optical lens 10 (sample nos. 13 to 17) that is discussed in Example 3. The respective items of FIG. 14A indicate numerical values of the conditions having the same contents as those of the respective items of FIG. 13.

In the present Example 3, whether or not weld lines are present is evaluated while "the thickness T1 of the thinnest portion 18" and "the thickness T2 (=B−C) of the flange portion 14 at the positions where the concave portions 40 are provided" are adjusted. Specifically, regarding each of the sample nos. 13 to 17 shown in FIG. 14A, whether or not weld lines are present is evaluated whenever "the thickness T1 of the thinnest portion 18" and "the thickness T2 of the flange portion 14 at the positions where the concave portions 40 are provided" are changed under the same conditions as those of the sample nos. 1 to 6 shown in FIG. 12.

Figures 14B, 15:
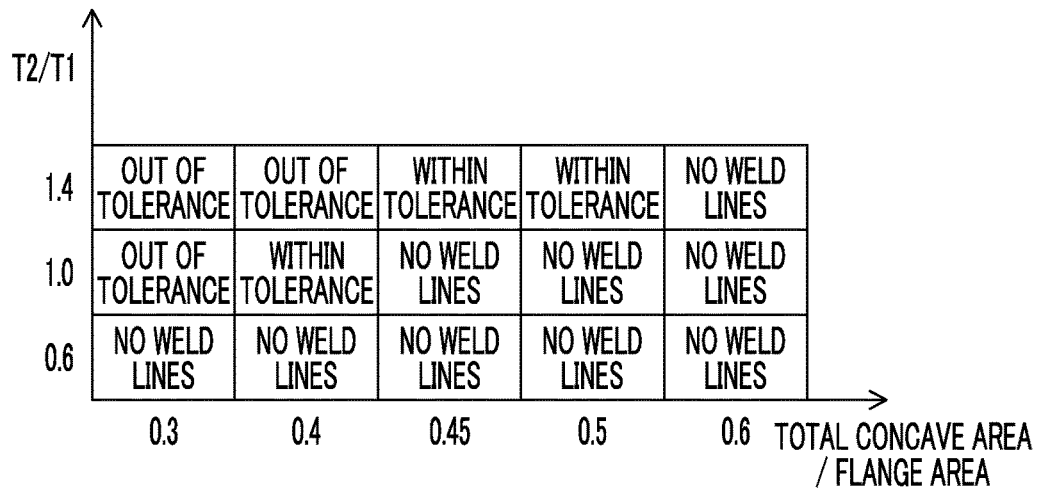
FIG. 14B shows "states of occurrence of weld lines" in a case where a horizontal axis indicates a ratio of "an area of concave portions of the optical lens" to "an area of a flange portion of the optical lens" and a vertical axis indicates a ratio of "a thickness of a flange portion at the positions where the concave portions are provided" to "a thickness of a thinnest portion".
FIG. 15 is a table showing conditions of "the ratio of the area of the concave portions of the optical lens to the area of the flange portion of the optical lens" and "the ratio of the thickness of the flange portion at the positions where the concave portions are provided to the thickness of the thinnest portion", in a case of "no weld lines" in the "states of occurrence of weld lines" shown in FIG. 14B.

FIG. 14B shows "states of occurrence of weld lines" in a case where the horizontal axis indicates "the ratio of the area of the concave portions 40 of the optical lens 10 to the area of the flange portion 14 (refer to indications of "total concave area/flange area" of FIG. 14B)" and the vertical axis indicates a ratio "T2/T1" of "the thickness T2 (=B−C) of the flange portion 14 at the positions where the concave portions 40 are provided" to "the thickness T1 of the thinnest portion 18".

In FIG. 14B, the "states of occurrence of weld lines" indicate cases where the ratio "T2/T1" (vertical axis) is "0.6", "1.0" and "1.4" in respective cases where the "total concave area/flange area" (horizontal axis) is "0.3", "0.4", "0.45", "0.5", and "0.6". In FIG. 14B, the indication "no weld lines" indicates a case where weld lines are not visually viewed in the molded optical lens 10. The indication "within tolerance" indicates a case where weld lines are detected in the molded optical lens 10 but the detected weld lines are minor defects to the extent that the weld lines are ignorable in practical use. The indication "out of tolerance" indicates a case where weld lines are detected in the molded optical lens 10 and caution about the detected weld lines in practical use is necessary.

FIG. 15 is a table showing conditions of "the ratio of the area of the concave portions 40 of the optical lens 10 to the area of the flange portion 14 (refer to the indications of "total concave area/flange area (S2/S1)" of FIG. 15)" and "the ratio of the thickness T2 of the flange portion 14 at the positions where the concave portions 40 are provided to the thickness T1 of the thinnest portion 18 (refer to the indications of "T2/T1" of FIG. 15)", in a case of "no weld lines" in the "states of occurrence of weld lines" shown in FIG. 14B.

Figure 16:
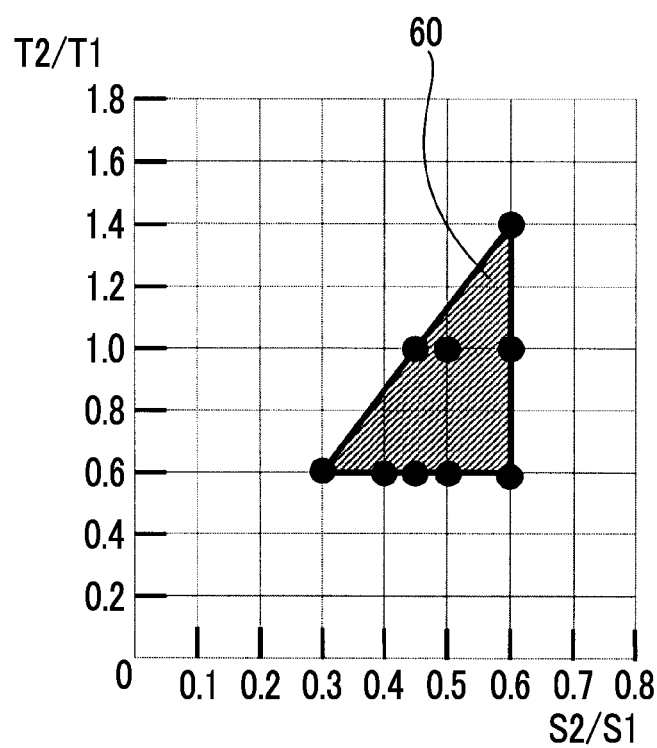
FIG. 16 is a graph in which conditions in a case of "no weld lines" in the "states of occurrence of weld lines" shown in FIG. 15 are plotted.

FIG. 16 is a graph in which conditions in a case of "no weld lines" in the "states of occurrence of weld lines" shown in FIG. 15 are plotted. The horizontal axis of FIG. 16 indicates "the ratio of the area of the concave portions 40 of the optical lens 10 to the area of the flange portion 14 (refer to the indications of "S2/S 1" of FIG. 16)". The vertical axis indicates "the ratio of the thickness T2 of the flange portion 14 at the positions where the concave portions 40 are provided to the thickness T1 of the thinnest portion 18 (refer to the indications of "T2/T1" of FIG. 16)".

From "the condition of "no weld lines" in the states of occurrence of weld lines" plotted in FIG. 16, it can be seen that a range (hereinafter referred to as "a proper range") 60 which is hatched in FIG. 16 is a range in which the condition is preferable.

That is, from the result of Example 3, the inventor of the present invention found the following fact: it is preferable that "S2/S1" and "T2/T1" are present in the proper range 60 of FIG. 16. In the proper range 60, "T2/T1≤(8/3)×(S2/S1)−0.2 (Expression 1)", "T2/T1≥—0.6 (Expression 2)", and "S2/S1≤0.6 (Expression 3)" are satisfied by "the thickness T1 of the thinnest portion 18 of the optical lens 10", "the thickness T2 of the flange portion 14 in the concave portions 40 of the optical lens 10", "the area S1 of the flange portion 14 in a case where it is assumed that the concave portions 40 are not provided on the surface where the concave portions 40 should be provided in the flange portion 14", and "the area S2 which is occupied by the concave portions 40 on the surface where the concave portions 40 are provided in the flange portion 14".

Under the conditions satisfying the Expressions 1 to 3, it was seen that "the fluid state of the resin which flows into the optical molding portion 23" and "the fluid state of the resin which flows into the flange molding portion 24" are not appropriately controlled and thus the accuracy in molding of the optical lens 10 deteriorates. Further, in particular, if "the ratio ("T2/T1") of the thickness T2 of the flange portion 14 at the positions where the concave portions 40 are provided to the thickness T1 of the thinnest portion 18" is less than "0.6", it is difficult to secure a sufficient strength of the optical lens 10 (particularly the flange portion 14). In addition, "the thickness T2 of the flange portion 14 at the positions where the concave portions 40 are provided" excessively decreases. As a result, it was seen that it is difficult to sufficiently fill the injection molding mold 20 with the resin at the time of injection molding.

As described above, according to the injection molding method of the present embodiment, in a case where the following are viewed from the optical axis direction Z of the optical lens 10, the thinnest portion 18 in the first region 44 surrounded by the two lines L1 and L2, which respectively connect both end portions 42a and 42b of the cut section 42 to the optical axis center O of the optical lens 10, and the single line L3, which connects both end portions 42a and 42b of the cut section 42, is present in the optical function portion 12, and the concave portions 40 of the flange portion 14 are provided outside the first region 44. Thereby, by controlling "the fluid state of the resin which flows into the optical molding portion 23 including the thinnest portion molding section 29 in the injection molding mold 20" and "the fluid state of the resin which flows into the flange molding portion 24 in the injection molding mold 20", it is possible to accurately form an optical lens 10 (particularly, the optical function portion 12) having desired optical characteristics.

Modification Examples

The optical lens 10 and the injection molding mold 20 are not limited to the above-mentioned examples, and may be modified into various forms.

Figure 17A:
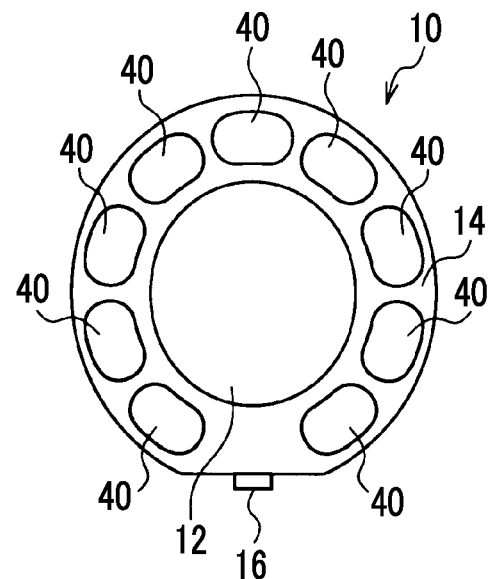
FIG. 17A is a diagram illustrating a modification example of the optical lens.
Figure 17B:
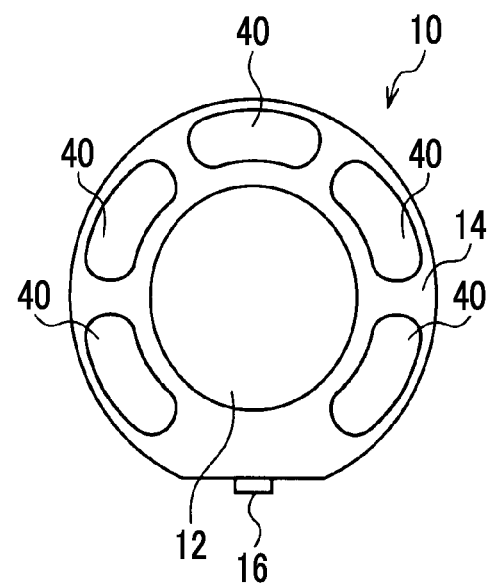
FIG. 17B is a diagram illustrating a modification example of the optical lens.
Figure 17C:
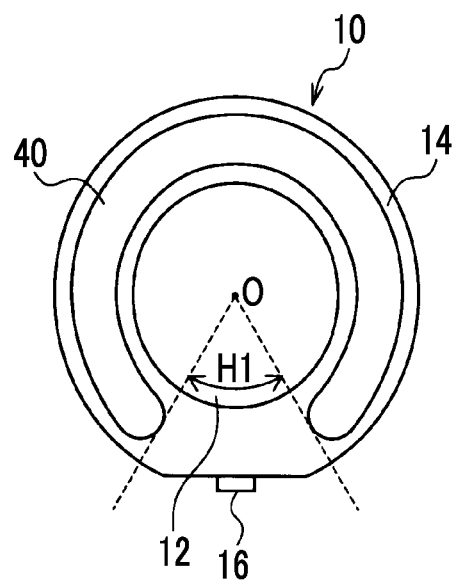
FIG. 17C is a diagram illustrating a modification example of the optical lens.
Figure 17D:
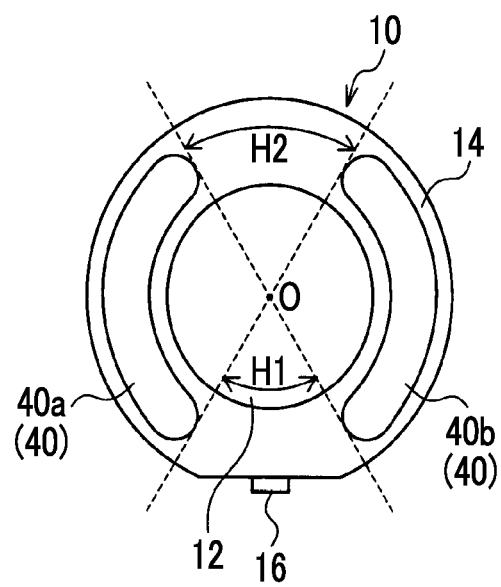
FIG. 17D is a diagram illustrating a modification example of the optical lens.

FIGS. 17A to 17D are diagrams illustrating modification examples of the optical lens 10. In the description of the above-mentioned optical lens 10 shown in FIG. 1 or the like, the example, in which three concave portions 40 or one concave portion 40 is provided on the flange portion 14, has been given. However, an arbitrary number of concave portions 40 may be provided on the flange portion 14. For example, as shown in FIG. 17A, nine concave portions 40 may be provided on the flange portion 14, and as shown in FIG. 17B, five concave portions 40 may be provided on the flange portion 14. Further, as shown in FIG. 17C, a single concave portion 40 may be provided on the flange portion 14, and the end portions of the concave portion 40 may be positioned with the gate portion 16 interposed therebetween, whereby the central angle H1, which is formed by the two straight lines respectively connecting the end portions to the optical axis center O, can be set to, for example, 60°. Furthermore, as shown in FIG. 17D, two concave portions 40 (first concave portion 40a and second concave portion 40b) may be provided on the flange portion 14 with the gate portion 16 interposed therebetween. In this case, the central angle H1, which is formed by the two straight lines respectively connecting the end portion of first concave portion 40a close to the gate portion 16 and the end portion of the second concave portion 40b close to the gate portion 16 to the optical axis center O, can be set to, for example, 60°. Further, the central angle H2, which is formed by the two straight lines respectively connecting the end portion of first concave portion 40a opposite to the gate portion 16 and the end portion of the second concave portion 40b opposite to the gate portion 16 to the optical axis center O, can be set to, for example, 60°.

Further, "the central angles H1 and H2 (refer to FIG. 10), which are formed by the two straight lines connecting the respective end portions of the adjacent concave portions 40 to the optical axis center O" and "the central angle H3 which is formed by the two straight lines respectively connecting both ends of each concave portion 40 to the optical axis center O" are also not particularly limited. As shown in FIG. 1, in the case where the three concave portions 40 are provided on the flange portion 14 of the optical lens 10, for example, the central angle H1 may be set to 50°, the central angle H2 may be set to 30°, and the central angle H3 may be set to 83.3°. Further, as shown in FIG. 17A, in the case where the nine concave portions 40 are provided on the flange portion 14 of the optical lens 10, for example, the central angle H1 may be set to 50°, the central angle H2 may be set to 5°, and the central angle H3 may be set to 30°. Furthermore, as shown in FIG. 17B, in the case where the five concave portions 40 are provided on the flange portion 14 of the optical lens 10, for example, the central angle H1 may be set to 50°, the central angle H2 may be set to 10°, and the central angle H3 may be set to 54°.

In the description of the above-mentioned embodiment, the example, in which the concave portions 40 are provided on "the rear surface" of the flange portion 14 of the optical lens 10, has been given. However, the concave portions 40 may be provided on "the front surface" of the flange portion 14, and the concave portions 40 may be provided both "the front surface" and "the rear surface" of the flange portion 14.

<Imaging Module>

Next, an example of the imaging module using the above-mentioned optical lens 10 will be described.

Figure 18:
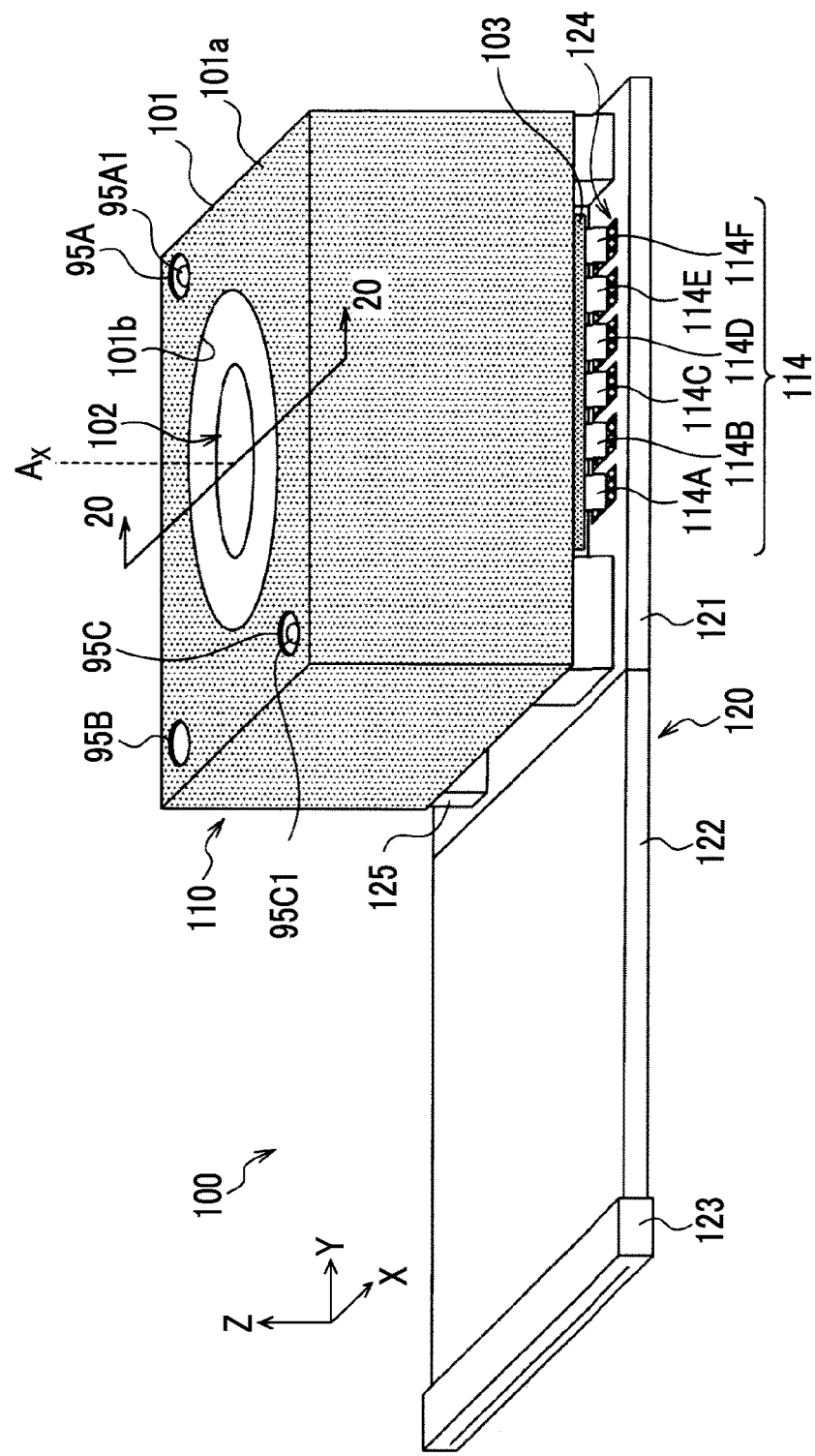
FIG. 18 is a perspective view of an appearance of an example of an imaging module.

FIG. 18 is a perspective view of an appearance of an example of the imaging module 100.

The imaging module 100 comprises a lens unit 110 and an imaging element unit 120. The lens unit 110 has a lens group 102 that includes the optical lens 10. The imaging element unit 120 has an imaging element (refer to the reference sign "127" of FIG. 19 to be described later) that captures an image of a subject through the optical lens 10 of the lens group 102.

In FIG. 18, a direction along an optical axis Ax of the lens group 102 is set as a Z direction, and two directions, which are orthogonal to the Z direction and orthogonal to each other, are respectively set as X and Y directions.

The lens unit 110 comprises a housing 101 in which components to be described later are housed.

An opening 101b, of which the center is on the optical axis Ax of the lens group 102, is formed on a top surface 101a of the housing 101. The imaging module 100 performs imaging by capturing subject light from the opening 101b to lens group 102.

Further, positioning concave portions 95A, 95B, and 95C used for holding the lens unit 110 in a manufacturing apparatus at the time of manufacturing the imaging module 100 are formed on the top surface 101a of the housing 101. Concave portions 95A1 and 95C1 smaller than the concave portions 95A and 95C are formed on the bottom surfaces of the concave portions 95A and 95C which are disposed to be diagonal to the top surface 101a.

A part of a flexible substrate 103 housed in the housing 101 is exposed to the outside of the housing 101. A lens unit terminal section 114 included in terminals 114A to 114F is connected to the leading end of an exposed part of the flexible substrate 103. The lens unit terminal section 114 is exposed from a surface other than the top surface 101a on a plane orthogonal to the Z direction among the surfaces constituting the housing 101.

The lens unit terminal section 114 also includes terminals other than the terminals 114A to 114F, but FIG. 18 shows only the terminals 114A to 114F for simplification, and does not show the other terminals.

Figure 19:
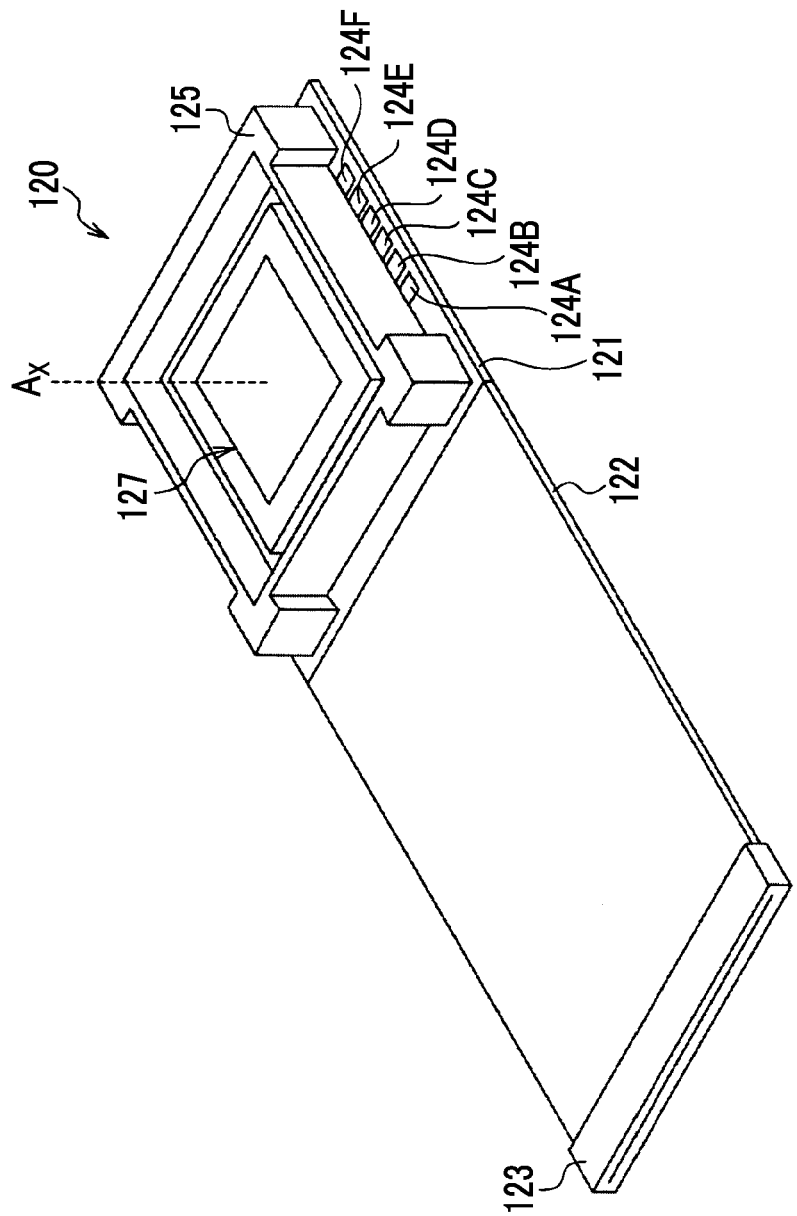
FIG. 19 is a perspective view of an appearance of the imaging module shown in FIG. 18 in a state where a lens unit is omitted.

FIG. 19 is a perspective view of an appearance of the imaging module 100 shown in FIG. 18 in a state where the lens unit 110 is omitted.

As shown in FIG. 19, the imaging element unit 120 comprises a substrate 121 on which an imaging element 127 such as a CCD image sensor or a CMOS image sensor, and a flexible substrate 122 which is electrically connected to a substrate 121.

The pixel pitch of the imaging element 127 is not particularly limited. However, in a case where the imaging element 127 having a pixel pitch of 1.0 μM or less is used, the above-mentioned optical lens 10 having excellent optical characteristics is particularly useful.

Recently, in accordance with an increase in the number of pixels, the pixel pitch of the imaging element 127 decreases. If the pixel pitch of the imaging element 127 decreases, an area per one pixel decreases. Therefore, a radius of a permissible circle of confusion decreases, and a focal depth thereof decreases. Further, it is necessary to increase an amount of concentrated light per one pixel, and thus an F number of the lens also tends to decrease.

In terms of such a situation, it is necessary for the focal depth of the recent imaging module 100 to be extremely low, and it is necessary for the accuracy of positioning of the lens unit 110 and the imaging element unit 120 to be high. If the pixel pitch is equal to or less than 1 μm, particularly high positioning accuracy is necessary.

A base member 125, which is formed in a barrel shape having an opening corresponding to the imaging element 127, is provided on the substrate 121, and the imaging element 127 is disposed inside the base member 125. A cover glass not shown is inserted into a hollow portion of the base member 125, above the imaging element 127.

An imaging element unit terminal section 124, which includes terminals 124A to 124F for being electrically connected with the lens unit 110, is provided on the surface of the substrate 121 outside the base member 125. Also in the drawing of the imaging element unit terminal section 124, only some of the terminals are shown, in a manner similar to that of the lens unit terminal section 114.

An imaging element wire, which is connected to a data output terminal and a driving terminal of the imaging element 127, is provided on the substrate 121. The imaging element wire is connected to an external connection terminal section 123 that is provided on the end portion of the flexible substrate 122, through a wire provided on the flexible substrate 122. The external connection terminal section 123 functions as an electrical connection portion that is electrically connected to the imaging element 127.

Further, a lens unit wire, which is connected to the terminals included in the imaging element unit terminal section 124, is provided on the substrate 121. The lens unit wire is connected to an external connection terminal section 123 that is provided on the end portion of the flexible substrate 122, through a wire provided on the flexible substrate 122.

In a state where the lens unit 110 and the imaging element unit 120 are fixed, each terminal of the lens unit terminal section is electrically connected to each terminal of the imaging element unit terminal section 124 corresponding thereto.

In FIG. 18, the terminal 114A and the terminal 124A are electrically connected, the terminal 114B and the terminal 124B are electrically connected, the terminal 114C and the terminal 124C are electrically connected, the terminal 114D and the terminal 124D are electrically connected, the terminal 114E and the terminal 124E are electrically connected, and the terminal 114F and the terminal 124F are electrically connected.

Figure 20:
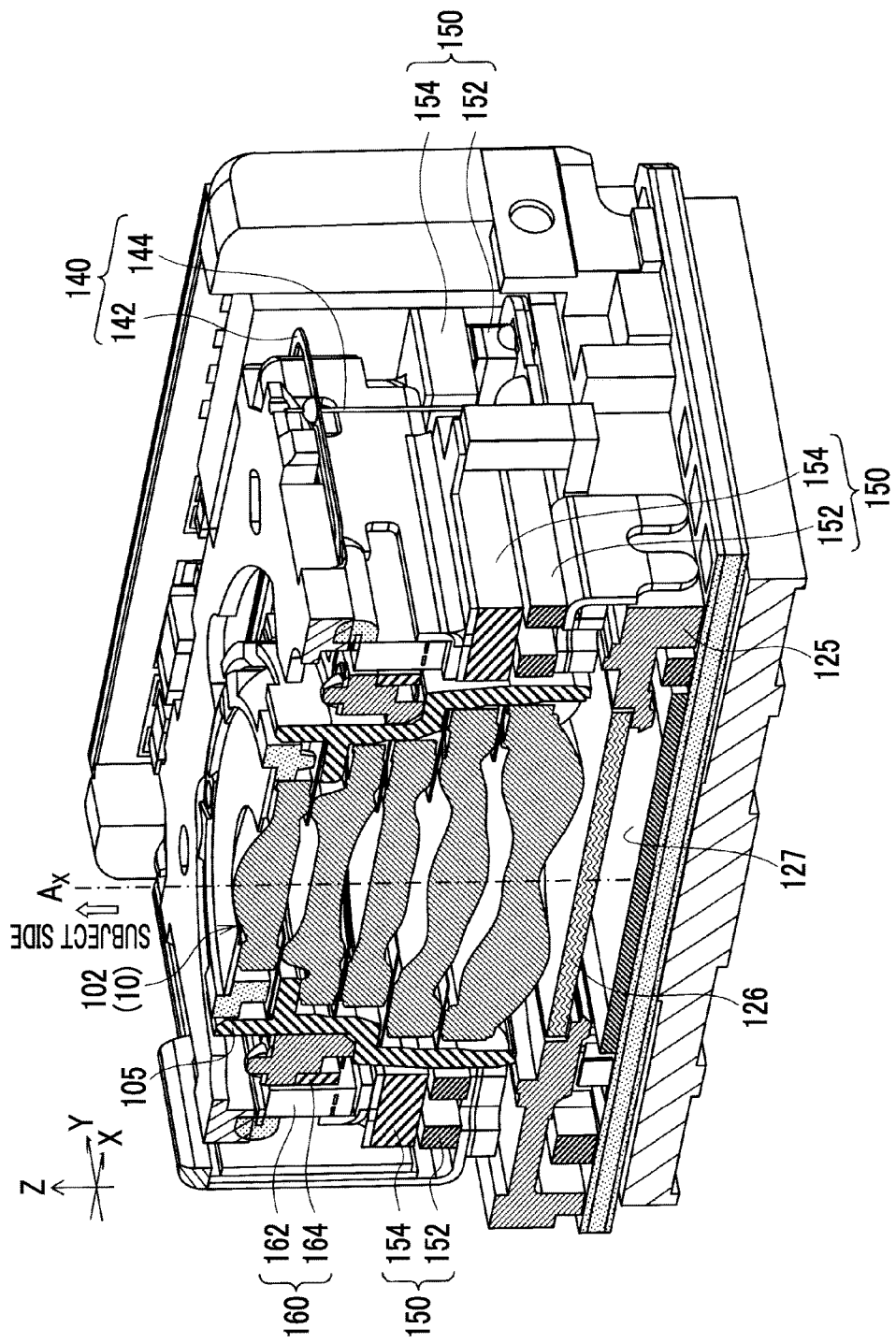
FIG. 20 is a cross-sectional perspective view of the imaging module taken along the sectional line 20-20 of FIG. 18.

FIG. 20 is a cross-sectional perspective view of the imaging module 100 taken along the sectional line 20-20 of FIG. 18.

As shown in FIG. 20, the imaging element 127 is mounted on the substrate 121, and is sealed by the base member 125, which is provided on the substrate 121, and the cover glass 126 which is inserted into the base member 125.

The lens unit 110 comprises: the lens group 102 that includes the optical lens 10 disposed above the cover glass 126; a lens barrel 105 that has a barrel shape and supports the lens group 102; an elastic supporting section 140; an optical image stabilization (OIS) mechanism 150; and a focus adjustment mechanism 160 that moves the lens barrel 105 in the optical axis direction.

It is preferable that the lens unit 110 comprises at least one optical lens 10, but in the present example, the lens group 102 is formed of five optical lenses 10. In each optical lens 10, the flange portion 14 (refer to FIG. 1) is positioned to be supported by the lens barrel 105. In the present example, each optical lens 10 is positioned such that at least a part of a region other than the concave portion 40 on the surface (the rear surface of the optical lens 10 shown in FIGS. 1 to 3) having the concave portion 40 of the flange portion 14 of the optical lens 10 is in contact with the lens barrel 105. However, the flange portion 14 of the optical lens 10 may be in contact with any member such as a different lens, a light blocking plate, or a spacing ring other than the lens barrel 105.

The elastic supporting section 140 includes a leaf spring 142, and four suspension wires 144 of which one end is fixed onto the leaf spring 142 and the other end is fixed onto the base member 125 side.

The OIS mechanism 150 includes a voice coil motor that is formed of OIS driving coils 152, which are fixed onto the base member 125 side (fixed side), and an OIS driving magnet 154.

FIG. 20 shows the pair of OIS driving coils 152 and the OIS driving magnet 154 in the X direction of a 3-axis orthogonal coordinate system in which the optical axis direction of the lens group 102 is set as the Z axis. However, the pair of OIS driving coils 152 and the OIS driving magnet 154 are also provided in the Y direction. By driving the OIS driving coils 152 in the X and Y directions, it is possible to perform hand shaking correction.

The focus adjustment mechanism 160 includes a voice coil motor that is formed of an auto focus (AF) coil 162 and an AF magnet 164 arranged around the lens barrel 105. By driving the voice coil motor so as to move the lens barrel 105 in the optical axis direction (Z direction), it is possible to perform focus adjustment.

Further, the OIS mechanism 150 and the focus adjustment mechanism 160 comprises Hall elements (not shown in the drawing) as position detection elements that respectively detect positions of the lens group 102 (lens barrel 105) in the XYZ axis directions.

<Electronic Apparatus>

Next, an electronic apparatus comprising the above-mentioned imaging module 100 will be described.

Examples of the electronic apparatus equipped with the imaging module 100 having the configuration may include a smartphone, a mobile phone, a tablet terminal, a portable information terminal (PDA), an eyeglass-type information terminal, a portable game machine, a portable music player, a camera-equipped clock (a wristwatch-type equipment, or the like), a PC, and the like. Hereinafter, a detailed description will be given of an example of a smartphone with reference to the accompanying drawings.

<Configuration of Smartphone>

Figure 21:
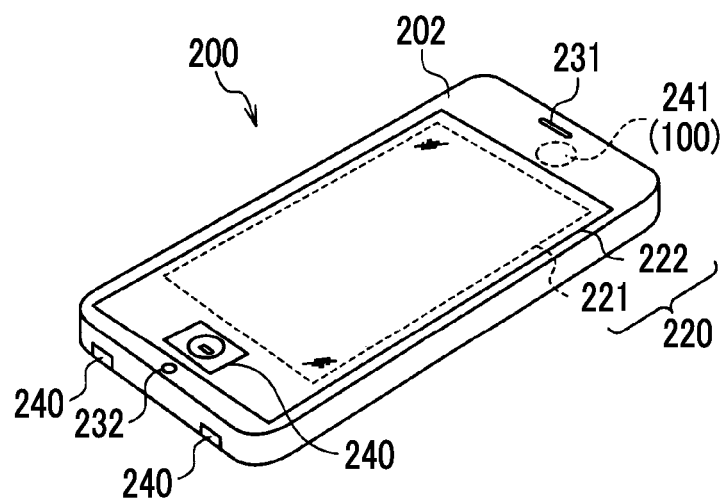
FIG. 21 is a diagram illustrating an appearance of a smartphone equipped with the imaging module.

FIG. 21 is a diagram illustrating an appearance of a smartphone 200 equipped with the imaging module 100. The smartphone 200 shown in FIG. 21 includes: a housing 202 that has a flat plate shape; a display panel 221 as a display section on one side of the housing 202; and a display input section 220 into which an operation panel 222 as an input section is integrated. Further, the housing 202 comprises a speaker 231, a microphone 232, an operation section 240, and a camera section 241 including the above-mentioned imaging module 100.

The camera section 241 is disposed on the rear surface side facing the operation side surface on which the speaker 231 is disposed, in the vicinity of the speaker 231 which is a magnetic field generating section. Further, the configuration of the housing 202 is not limited to this. For example, it may be possible to adopt a configuration in which the input section and the display section are independently provided, or it may be possible to adopt a configuration having a slide mechanism or a folded structure.

Figure 22:
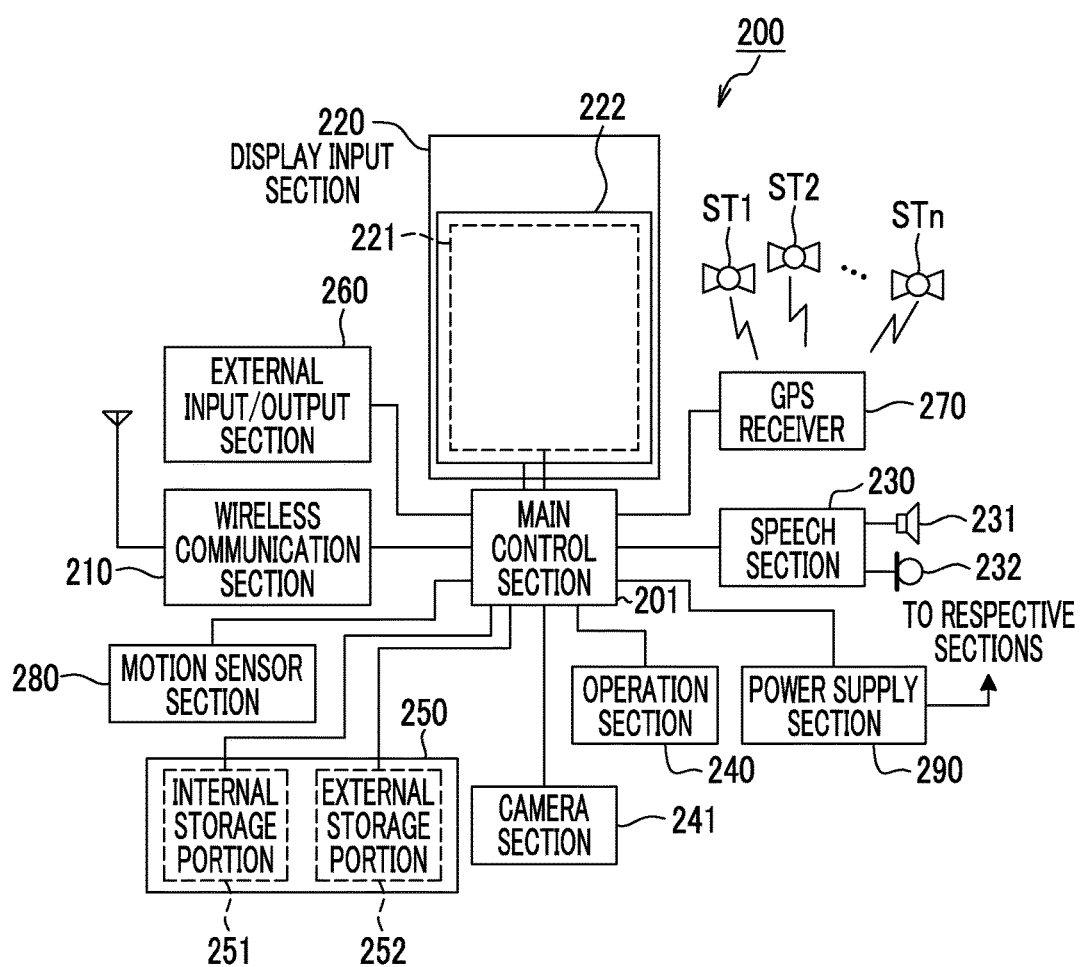
FIG. 22 is a functional block diagram illustrating a configuration example of the smartphone shown in FIG. 21.
Figure 23:
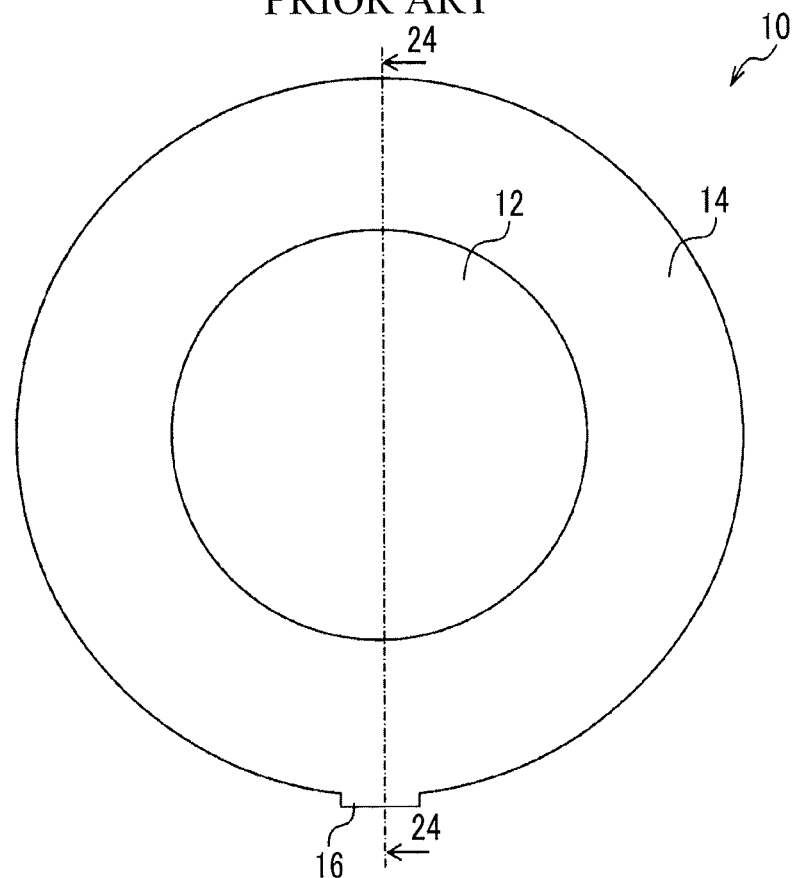
FIG. 23 is a plan view of a rear surface of the optical lens formed in a conventional molding method as viewed from the optical axis direction.
Figure 24:
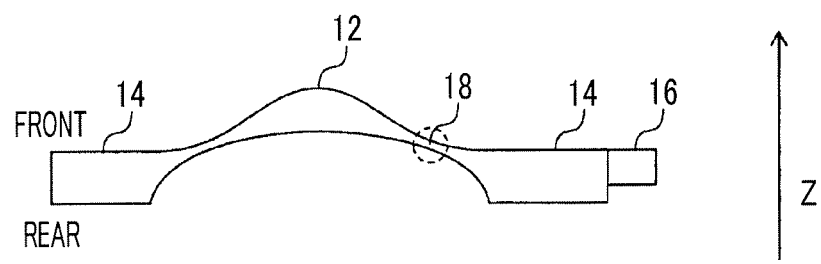
FIG. 24 is a cross-sectional view of the optical lens taken along the sectional line 24-24 of FIG. 23.
Figure 25:
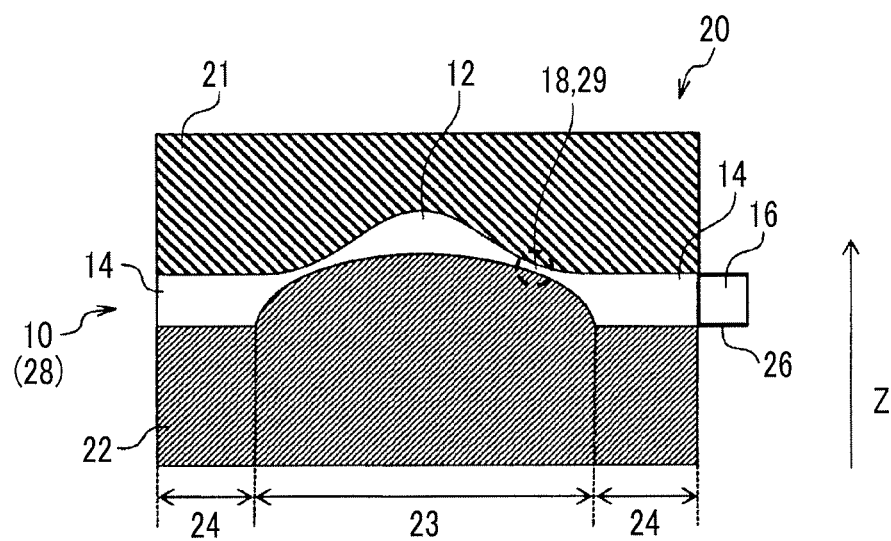
FIG. 25 is a cross-sectional view illustrating an example of a conventional injection molding mold used to mold the optical lens shown in FIGS. 23 and 24.

FIG. 22 is a block diagram illustrating a configuration of the smartphone 200 shown in FIG. 21. As shown in FIG. 22, as main components of the smartphone 200, there are a wireless communication section 210, a display input section 220, a speech section 230, operation sections 240, a camera section 241, a storage section 250, an external input/output section 260, a global positioning system (GPS) receiver 270, a motion sensor section 280, a power supply section 290, and a main control section 201. Further, as the main function of the smartphone 200, there is provided a wireless communication function for performing mobile wireless communication with a base station device through a mobile communication network.

The wireless communication section 210 performs wireless communication with the base station device, which is included in the mobile communication network, in accordance with an instruction of the main control section 201. Using this wireless communication, various kinds of file data such as audio data and image data, e-mail data, and the like are transmitted and received, and web data, streaming data, and the like are received.

The display input section 220 is a so-called touch panel, and comprises the display panel 221 and the operation panel 222. The touch panel displays image (still image and moving image) information, text information, or the like so as to visually transfer the information to a user in accordance with control of the main control section 201, and detects a user operation on the displayed information. In a case of monitoring a generated 3D image, it is preferable that the display panel 221 is a 3D display panel.

The display panel 221 uses a liquid crystal display (LCD), an organic electro-luminescence display (OELD), or the like as a display device.

The operation panel 222 is a device that is provided for viewing an image which is displayed on a display screen of the display panel 221 and that detects coordinates at which an operation is performed by a user's finger or a stylus. If such a device is operated by a user's finger or a stylus, the device outputs a detection signal, which is generated due to the operation, to the main control section 201. Subsequently, the main control section 201 detects an operation position (coordinates) on the display panel 221, on the basis of the received detection signal.

As shown in FIG. 21, the display panel 221 and the operation panel 222 of the smartphone 200 are integrated to constitute the display input section 220. However, the operation panel 222 is disposed to completely cover the display panel 221. When this arrangement is adopted, the operation panel 222 may have a function of also detecting a user operation in a region outside the display panel 221. In other words, the operation panel 222 may include a detection region (hereinafter referred to as a display region) for a part which overlaps with the display panel 221 and a detection region (hereinafter referred to as a non-display region) for the other part at the outer edge which does not overlap with the display panel 221.

It should be noted that a size of the display region and a size of the display panel 221 may completely coincide with each other, but it is not always necessary for both to coincide with each other. Further, the operation panel 222 may comprise two sensing regions of the outer edge part and the other inside part. Furthermore, a width of the outer edge part is appropriately designed depending on a size of the housing 202 and the like. In addition, examples of the position detection method adopted by the operation panel 222 may include a matrix switch method, a resistance film method, a surface elastic wave method, an infrared method, an electromagnetic induction method, and an electrostatic capacitance method, and the like, and any method may be adopted.

The speech section 230 comprises a speaker 231 and a microphone 232. The speech section 230 converts a sound of a user, which is input through the microphone 232, into sound data, which can be processed in the main control section 201, and outputs the data to the main control section 201, or decodes sound data, which is received by the wireless communication section 210 or the external input/output section 260, and outputs the data from the speaker 231. Further, as shown in FIG. 21, for example, the speaker 231 and the microphone 232 can be mounted on the same surface as the surface on which the display input section 220 is provided.

The operation section 240 is a hardware key using a key switch or the like, and receives an instruction from a user. For example, the operation sections 240 are pressing button type switches which are mounted on the lower side surface of the lower part of the housing 202 of the smartphone 200. Each switch is turned on if it is pressed by a finger or the like, and is turned off due to restoring force of a spring if the finger is released.

The storage section 250 stores a control program and control data of the main control section 201, the first filter according to the present invention, address data in which names, phone numbers, and the like of communication partners are associated, received and transmitted e-mail data, web data which is downloaded by web browsing, and downloaded contents data, and temporarily stores streaming data and the like. Further, the storage section 250 is constituted of an internal storage portion 251, which is built into the smartphone, and an external storage portion 252 which has a removable external memory slot. In addition, each of the internal storage portion 251 and the external storage portion 252 constituting the storage section 250 is implemented by using a storage medium such as a flash memory type, a hard disk type, a multimedia card micro type, a card type memory (such as a Micro SD (registered trademark) memory), a random access memory (RAM), or a read only memory (ROM).

The external input/output section 260 has a function of an interface with all external devices connected to the smartphone 200. The external input/output section 260 is for communication (such as universal serial bus (USB) or IEEE1394) with other external devices, direct or indirect connection to networks (such as the Internet, wireless LAN, Bluetooth (registered trademark), radio frequency identification (RFID), infrared communication (Infrared Data Association: IrDA) (registered trademark), ultra wideband (UWB) (registered trademark), and ZigBee (registered trademark)), or the like.

Examples of the external devices connected to the smartphone 200 include a wired/wireless headset, a wired/wireless external charger, a wired/wireless data port, a memory card which is connected through a card socket, a subscriber identity module (SIM) or user identity module (UIM) card, external audio and video devices which are connected through audio and video input/output (I/O) terminals, external audio and video devices which are connected in a wireless manner, a smartphone which is connected in a wired or wireless manner, a personal computer which is connected in a wired or wireless manner, a PDA which is connected in a wired or wireless manner, an earphone which is connected in a wired or wireless manner, and the like. The external input/output section is able to transfer the data, which is transmitted from such external devices, to the components within the smartphone 200, and to transmit the data within the smartphone 200 to the external devices.

The GPS receiver 270 receives a plurality of GPS signals, which are transmitted from GPS satellites ST1 to STn, in accordance with instructions of the main control section 201, executes positioning calculation processing based on the received GPS signals, and detects a position formed of a latitude, a longitude, and an altitude of the smartphone 200. The GPS receiver 270 may detect the position by using position information when it is possible to acquire the position information from the wireless communication section 210 or the external input/output section 260 (for example, wireless LAN).

The motion sensor section 280 includes, for example, a triaxial acceleration sensor, and detects physical movement of the smartphone 200, in accordance with an instruction of the main control section 201. By detecting physical movement of the smartphone 200, an acceleration and a direction of the movement of the smartphone 200 are detected. This detection result is output to the main control section 201.

The power supply section 290 supplies the respective sections of the smartphone 200 with electric power, which is stored in a battery (not shown), in accordance with an instruction of the main control section 201.

The main control section 201 comprises a micro processor, and integrally controls the respective sections of the smartphone 200 by performing an operation on the basis of control data or a control program stored in the storage section 250. Further, the main control section 201 has an application processing function and a mobile communication control function of controlling the respective sections of a communication system in order to perform data communication and sound communication through the wireless communication section 210.

The application processing function is implemented by an operation of the main control section 201 using application software stored in the storage section 250. Examples of the application processing function include: an infrared communication function of performing data communication with other devices by controlling the external input/output section 260; an e-mail function of transmitting and receiving e-mails; a web browsing function of browsing web pages; and the like.

Further, the main control section 201 has an image processing function of displaying a video on the display input section 220 and the like, on the basis of image data (still image and moving image data) such as received data and downloaded streaming data. The image processing function means a function of causing the main control section 201 to decode the image data, apply image processing to the decoding result, and display an image on the display input section 220.

Further, the main control section 201 executes display control for the display panel 221 and operation detection control to detect the user operation through the operation sections 240 and the operation panel 222.

Through execution of the display control, the main control section 201 displays an icon for activating application software and a window for displaying a software key such as a scroll bar or creating an e-mail. It should be noted that the scroll bar means a software key for receiving an instruction to move a display portion of an image on a large image which cannot be entirely shown in the display region of the display panel 221.

Further, through execution of the operation detection control, the main control section 201 detects the user operation performed through the operation section 240, receives an operation performed on the icon or a text input performed in an input field of the window through the operation panel 222, or receives a request to scroll a displayed image through the scroll bar.

Furthermore, the main control section 201 has a touch panel control function performed through execution of the operation detection control. The function determines whether the operation position of the operation panel 222 is in the overlapping part (display region) which overlaps with the display panel 221 or the other part (non-display region) at the outer edge which does not overlap with the display panel 221, and controls the display position of the software key or the sensing region of the operation panel 222.

In addition, the main control section 201 may detect a gesture operation performed on the operation panel 222, and may execute a preset function in response to the detected gesture operation. The gesture operation is not a simple touch operation used in the past. The gesture operation means an operation for drawing a locus with a finger or the like, an operation of specifying a plurality of positions at the same time, or an operation of drawing loci from a plurality of positions to at least one position as a combination of the above-mentioned operations.

The camera section 241 is a digital camera for performing electronic photography by using the imaging element such as a complementary metal oxide semiconductor (CMOS) or a charge-coupled device (CCD). The above-mentioned imaging module 100 can be applied to the camera section 241.

Under the control of the main control section 201, the camera section 241 is able to convert the image data, which is obtained through image capturing, into compressed image data such as data of a joint photographic coding experts group (JPEG), and to record the data in the storage section 250 and to output the data through the external input/output section 260 or the wireless communication section 210. As shown in FIG. 21, in the smartphone 200 the camera section 241 is mounted on the rear side facing the display input section 220. However, the mounting position of the camera section 241 is not limited to this. The camera section 241 may be mounted on the same side as the display input section 220, or a plurality of camera sections 241 may be mounted. In addition, in the case where the plurality of camera sections 241 is mounted, imaging may be performed using a single camera section 241 by selecting the camera section 241 for the imaging, or imaging may be performed using the plurality of camera sections 241 at the same time.

Further, the camera section 241 can be used in various functions of the smartphone 200. For example, an image, which is acquired by the camera section 241, can be displayed on the display panel 221, and an image of the camera section 241 can be used for one of the operation inputs of the operation panel 222. Further, when the GPS receiver 270 detects a position, the GPS receiver 270 may detect the position with reference to an image obtained from the camera section 241. Further, it may be possible to determine a direction of an optical axis of the camera section 241 of the smartphone 200 or determine a current user environment, using the GPS receiver 270 in a combination with the triaxial acceleration sensor or without using the triaxial acceleration sensor, with reference to the image acquired from the camera section 241. Needless to say, the image acquired from the camera section 241 may be used in the application software.

In the OIS mechanism 150 of the present embodiment, the OIS driving coils 152 which are fixed onto the base member side (fixed side), and the OIS driving magnet is disposed on the movable section side (movable side) for hand shaking correction. However, contrary to this, the OIS driving magnet may be disposed on the base member side, and the OIS driving coils may be disposed on the movable section side for hand shaking correction.

Further, the number of the optical lenses 10 constituting the lens group 102 is not particularly limited, and the lens type of the optical lens 10 is not particularly limited.

The present invention is not limited to the above-mentioned embodiments, and may be modified into various forms without departing from the scope of the present invention.

EXPLANATION OF REFERENCES

10: optical lens
12: optical function portion
14: flange portion
16: gate portion
18: thinnest portion
20: injection molding mold
21: first mold
22: second mold
23: optical molding portion
24: flange molding portion
26: gate
28: resin inflow space
29: thinnest portion molding section
30: flange surface
34: runner portion
40: concave portion
40a: first concave portion
40b: second concave portion
40c: third concave portion
42: cut section
44: first region
46: inner peripheral surface
48: first axis
50: convex portion
50a: convex portion
50b: convex portion
50c: convex portion
54: second region
60: proper range
95A: concave portion
95A1: concave portion
95B: concave portion
95C: concave portion
95C1: concave portion
100: imaging module
101: housing
101a: top surface
101b: opening
102: lens group
103: flexible substrate 105: lens barrel
110: lens unit
114: lens unit terminal section
120: imaging element unit
121: substrate
122: flexible substrate
123: external connection terminal section
124: imaging element unit terminal section
125: base member
126: cover glass
127: imaging element
140: elastic supporting section
142: leaf spring
144: suspension wire
150: OIS mechanism
152: OIS driving coil
154: OIS driving magnet
160: focus adjustment mechanism
162: AF coil
164: AF magnet
200: smartphone
201: main control section
202: housing
210: wireless communication section
220: display input section
221: display panel
222: operation panel
230: speech section
231: speaker
232: microphone
240: operation section
241: camera section
250: storage section
251: internal storage section
252: external storage section
260: external input/output section
270: GPS receiving section
280: motion sensor section
290: power supply section

What is claimed is:

1. An optical lens comprising:
an optical function portion that has an optical function;
a flange portion that is formed around the optical function portion; and
wherein the flange portion has a cut section, which is used for injection molding, on a first side surface thereof,
wherein the flange portion has a second side surface and a total planar area of the second side surface of the flange portion is S1;
wherein the optical lens has a thinnest portion in a triangular region, which is located in the optical function portion, having vertexes at a center of an optical axis of the optical lens and both ends of the cut section in a circumferential direction, and boundary portions extending between the vertexes,
wherein the second side surface of the flange portion has at least one concave portion formed along a circumferential direction, and the at least one concave portion does not extend around the entire circumference of the flange,
wherein the at least one concave portion is wholly provided outside the triangular region,
wherein if a thickness of the thinnest portion is T1, a thickness of the flange portion in the concave portion is T2, and
wherein a total area of the at least one concave portion on the second side surface of the flange portion is S2, and the following are satisfied $T2/T1 \leq (8/3) \times (S2/S1) - 0.2$, $T2/T1 \geq 0.6$, and $S2/S1 \leq 0.6$.

2. The optical lens according to claim 1, wherein a central angle, which is formed by two lines connecting the center of the optical axis and two respective end portions of the at least one concave portion disposed at a position where a central point of the cut section is interposed therebetween of the optical lens, is equal to or less than 60°.

3. The optical lens according to claim 1, wherein a thickness of the flange portion in the at least one concave portion is equal to or less than 1.4 times a thickness of the thinnest portion.

4. The optical lens according to claim 1, wherein the thickness of the flange portion in the at least one concave portion is equal to or less than 1.2 times the thickness of the thinnest portion.

5. The optical lens according to claim 1, wherein the at least one concave portion has an inner peripheral surface that is oblique to a direction which is perpendicular to the surface on which the at least one concave portion is provided in the flange portion.

6. The optical lens according to claim 5, wherein an angle of inclination a formed between the inner peripheral surface of the at least one concave portion and a direction, which is perpendicular to the surface on which the at least one concave portion is provided in the flange portion, satisfies $0 < \alpha \leq 15°$.

7. The optical lens according to claim 1, wherein a shape, which is viewed from the direction of the optical axis of the at least one concave portion on the surface on which the at least one concave portion is provided in the flange portion, has a curve shape at an end portion at least close to the cut section between end portions of the at least one concave portion in a circumferential direction of the flange portion.

8. The optical lens according to claim 1,
wherein the flange portion has a plurality of the concave portions, and
wherein the plurality of the concave portions are provided in the flange portion so as to be line-symmetric with respect to an axis passing through the center of the optical axis of the optical lens and the center of the cut section in the flange portion.

9. A lens unit comprising at least one optical lens according to claim 1,
wherein at least a part of a region other than the concave portions on surfaces having the concave portions of the flange portion of the optical lens is in contact with any of a different optical lens, a light blocking plate, a lens barrel, and a spacing ring.

10. An imaging module comprising:
the lens unit according to claim 9; and
an imaging element that captures an image of a subject through the optical lens of the lens unit.

11. The imaging module according to claim 10, wherein a pixel pitch of the imaging element is equal to or less than 1 μm.

12. An electronic apparatus comprising the imaging module according to claim 10.

* * * * *